(12) United States Patent
Mochida et al.

(10) Patent No.: US 11,137,595 B2
(45) Date of Patent: Oct. 5, 2021

(54) LIGHT DEFLECTION DEVICE, IMAGE PROJECTOR, LASER HEAD LAMP, AND MOBILE OBJECT

(71) Applicants: Akitoshi Mochida, Osaka (JP); Tomohiko Kamatani, Osaka (JP)

(72) Inventors: Akitoshi Mochida, Osaka (JP); Tomohiko Kamatani, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 171 days.

(21) Appl. No.: 16/658,247

(22) Filed: Oct. 21, 2019

(65) Prior Publication Data

US 2020/0201028 A1    Jun. 25, 2020

(30) Foreign Application Priority Data

Dec. 19, 2018 (JP) .............................. JP2018-237764

(51) Int. Cl.
| | |
|---|---|
| G02B 26/08 | (2006.01) |
| G02B 26/10 | (2006.01) |
| F21S 41/675 | (2018.01) |
| G01S 7/481 | (2006.01) |
| G02B 27/01 | (2006.01) |
| G03G 15/04 | (2006.01) |

(52) U.S. Cl.
CPC ........ *G02B 26/0858* (2013.01); *F21S 41/675* (2018.01); *G02B 26/105* (2013.01); *G01S 7/4817* (2013.01); *G02B 27/0101* (2013.01); *G02B 27/0172* (2013.01); *G02B 2027/0178* (2013.01); *G03G 15/04036* (2013.01)

(58) Field of Classification Search
CPC ............. G02B 26/0858; G02B 26/105; G02B 27/0172; G02B 2027/0178; G02B 27/0101; F21S 41/675; G01S 7/4817; G03G 15/04036
USPC ...................................................... 359/199.4
See application file for complete search history.

(56) References Cited

U.S. PATENT DOCUMENTS

| | | | |
|---|---|---|---|
| 2015/0077823 A1* | 3/2015 | Hashiguchi | ........ G02B 26/0858 359/200.8 |
| 2017/0269352 A1 | 9/2017 | Hashiguchi et al. | |

FOREIGN PATENT DOCUMENTS

| | | |
|---|---|---|
| JP | 2015-158614 | 9/2015 |
| JP | 2015-230326 | 12/2015 |
| JP | 2017-173803 | 9/2017 |

* cited by examiner

*Primary Examiner* — Euncha P Cherry
(74) *Attorney, Agent, or Firm* — IPUSA, PLLC

(57) ABSTRACT

A light deflection device includes a reflector; a drive beam supporting the reflector such that the reflector is movable; a supporting section supporting the drive beam; and a piezoelectric drive circuit disposed on the drive beam. The light deflection device further includes circuitry configured to output a first drive-voltage waveform and a second drive-voltage waveform to the piezoelectric drive circuit. The first drive-voltage waveform has a period of a positive slope within one cycle, the period of the positive slope includes a period of a first slope and a period of a second slope different from the first slope. The second drive-voltage waveform has a period of a negative slope within one cycle, and the period of the negative slope includes a period of a third slope and a period of a fourth slope different from the third slope.

11 Claims, 30 Drawing Sheets

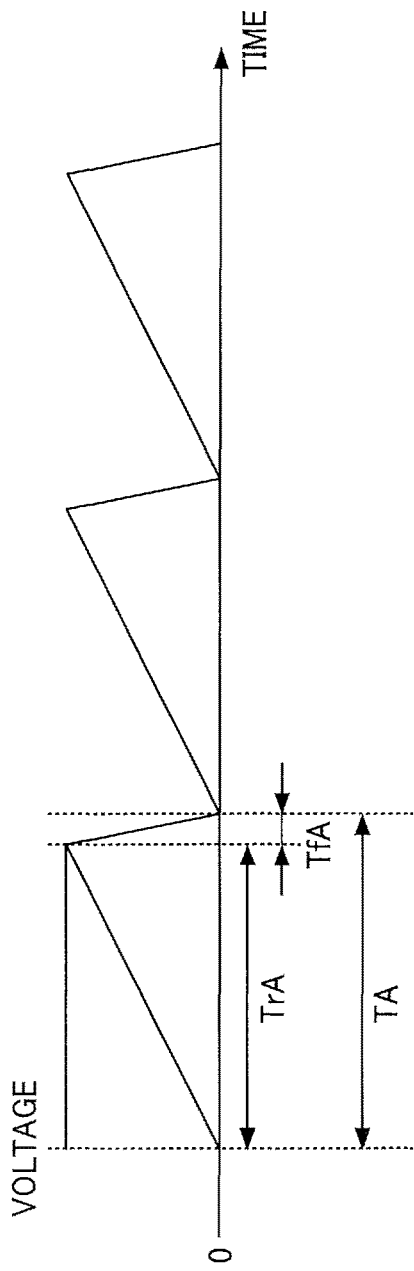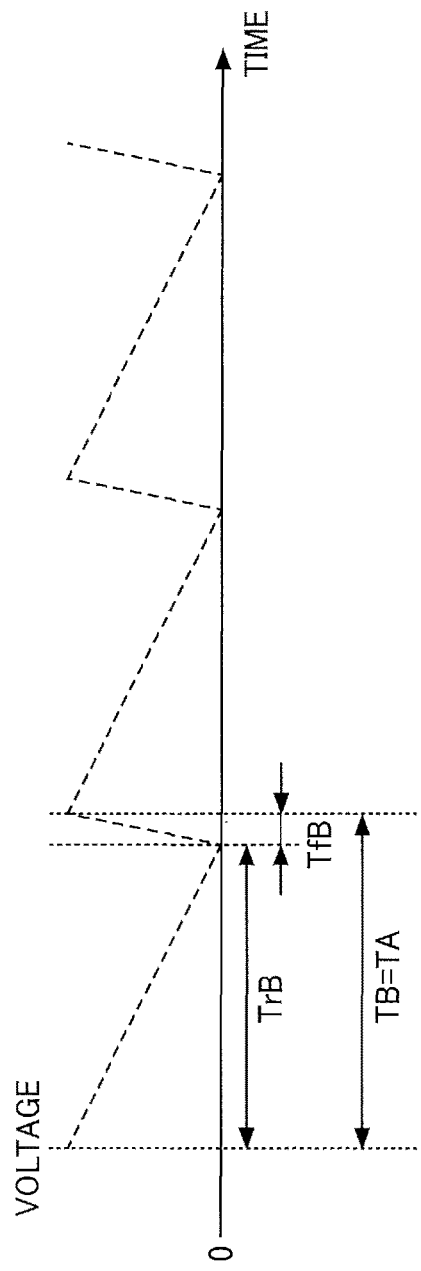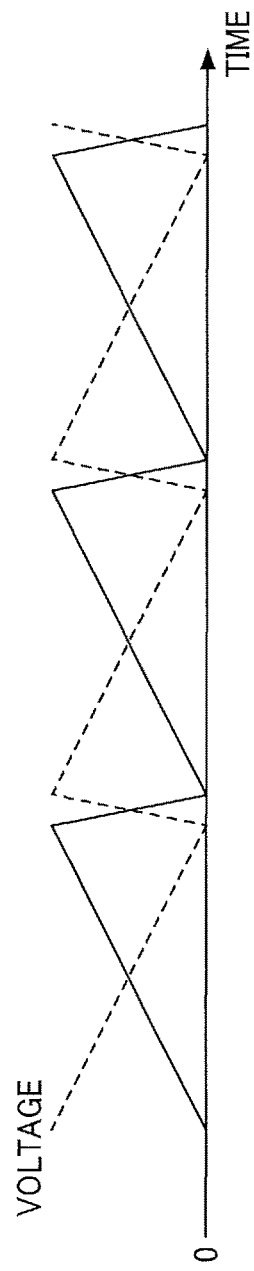
FIG. 19A
FIG. 19B
FIG. 19C

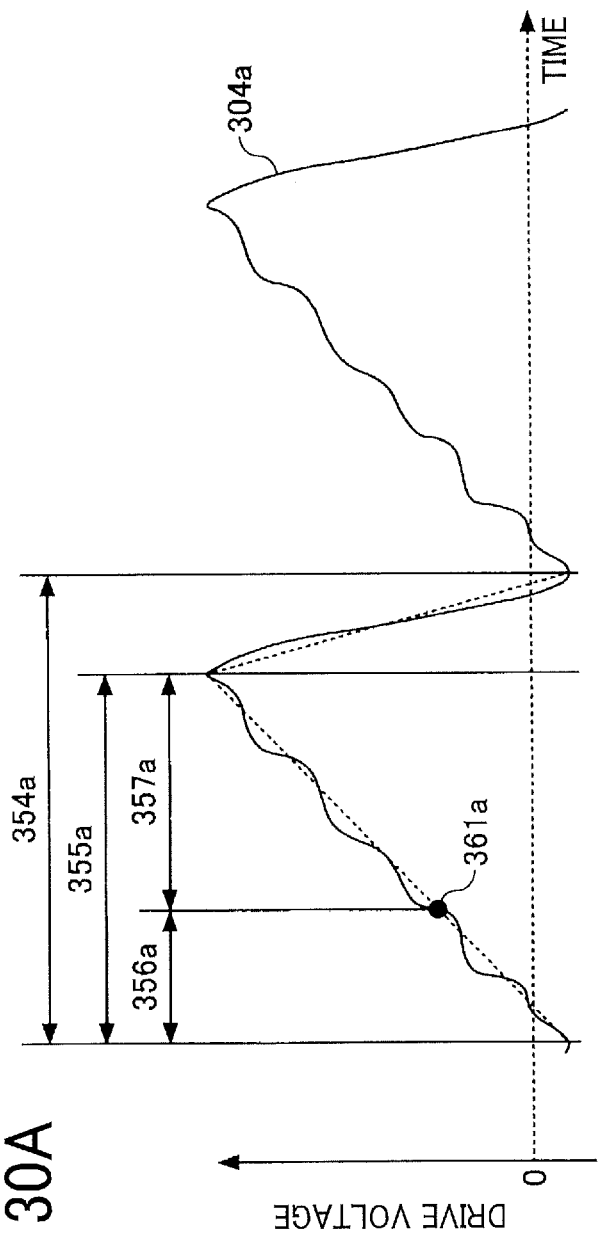
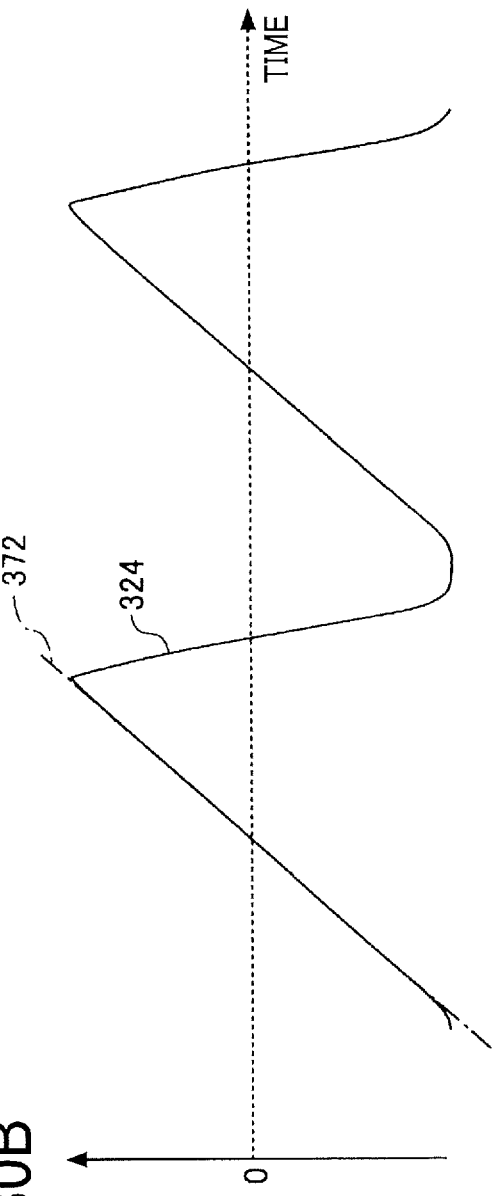
FIG. 30A
FIG. 30B

LIGHT DEFLECTION DEVICE, IMAGE PROJECTOR, LASER HEAD LAMP, AND MOBILE OBJECT

CROSS-REFERENCE TO RELATED APPLICATION

This patent application is based on and claims priority pursuant to 35 U.S.C. § 119(a) to Japanese Patent Application No. 2018-237764, filed on Dec. 19, 2018, in the Japan Patent Office, the entire disclosure of which is hereby incorporated by reference herein.

BACKGROUND

Technical Field

Embodiments of the present disclosure relate to a light deflection device, an image projector, a laser head lamp, and a mobile object.

Background Art

There is known a light deflection device that horizontally and vertically rotates the reflectors such as micro-electro-mechanical systems (MEMS) using the piezoelectric element so as to deflect light incident on the reflectors.

In the conventional light deflecting device, due to the piezoelectric characteristics of the piezoelectric element, a linearity error occurs in the amount of displacement of the piezoelectric element with respect to the applied voltage, and thus the desired rotation angle (deflection angle) and rotation speed (change rate of deflection angle) are not obtained.

SUMMARY

In one aspect of this disclosure, there is provided an improved A light deflection device including a reflector; a drive beam supporting the reflector such that the reflector is movable; a supporting section supporting the drive beam; and circuitry. The piezoelectric drive circuit is disposed on the drive beam, the piezoelectric drive circuit including a piezoelectric element that is deformable according to a waveform of a drive voltage. The piezoelectric element is configured to drive the reflector by deforming of the piezoelectric element. The circuitry is configured to output a first drive-voltage waveform and a second drive-voltage waveform to the piezoelectric drive circuit. The first drive-voltage waveform has a period of a positive slope within one cycle, the period of the positive slope including at least a period of a first slope and a period of a second slope different from the first slope. The second drive-voltage waveform has a period of a negative slope within one cycle, the period of the negative slope including at least a period of a third slope and a period of a fourth slope different from the third slope. The period of the second slope and the period of the fourth slope are set according to a change in a piezoelectric constant of the piezoelectric element.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 19A illustrates an example of the waveform of a drive voltage A that is applied to a piezoelectric-drive-circuit group A of the movable device;

FIG. 19B illustrates an example of the waveform of a drive voltage B that is applied to a piezoelectric-drive-circuit group B of the movable device;

FIG. 19C illustrates superimposed waveforms of the waveform of the drive voltage A in FIG. 19A and the waveform of the drive voltage B in FIG. 19B;

FIGS. 21A-1 and 21A-2 are illustrations of examples of image failure due to deflection-angle errors of the reflector, FIG. 21A-1 illustrating an example of an image formed by optical scanning light and FIG. 21-2 illustrating an example of an image formed by optical scanning light when a deflection-angle error occurs;

FIGS. 30A and 30B are illustrations for describing a waveform of a drive voltage and its effects in the second embodiment, FIG. 30A illustrating an example of the waveform of the drive voltage and FIG. 30B illustrating the deflection angle of the reflector when the drive voltage with the waveform in FIG. 30A is applied;

Figure 1:
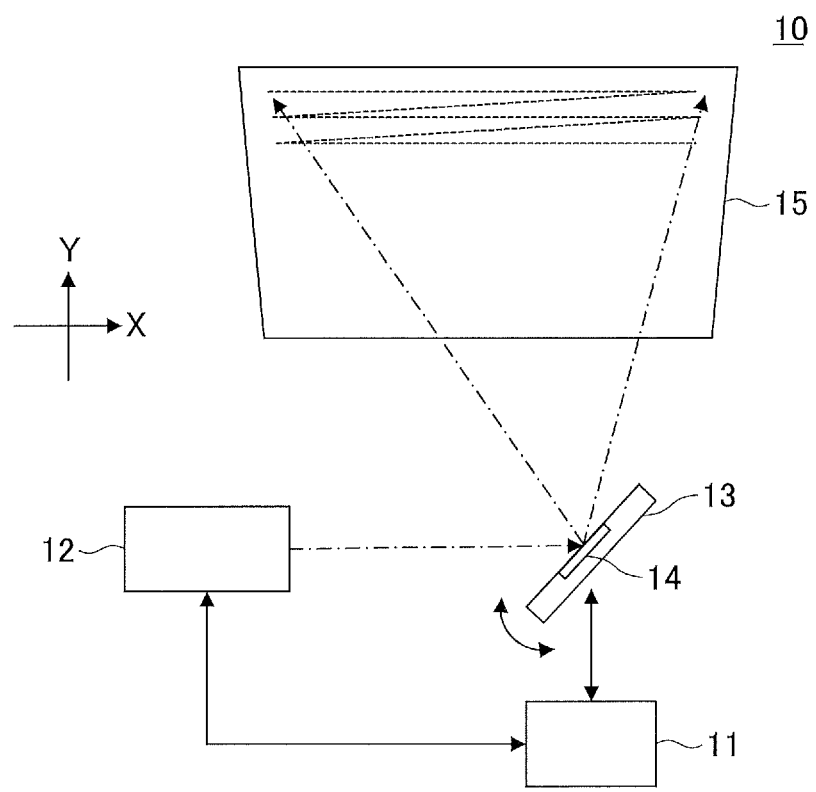
FIG. 1 is a schematic view of an example of an optical scanning system.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described below in detail.

An optical scanning system to which a movable device of an embodiment is applied is described in detail referring to FIGS. 1 to 4.

FIG. 1 is a schematic view of an example of an optical scanning system 10. As illustrated in FIG. 1, the optical scanning system 10 includes, for example, a control device 11, a light-source device 12, and a movable device 13 including a reflecting surface 14. As illustrated in FIG. 1, the optical scanning system 10 deflects light emitted from a light-source device 12 under the control of a control device 11, by using a reflecting surface 14 included in a movable device 13, so as to optically scan a target surface 15 to be scanned (hereinafter, referred to as target surface).

The optical scanning system 10 includes the control device 11, the light-source device 12, and the movable device 13 including the reflecting surface 14.

The control device 11 is, for example, an electronic circuit unit including, for example, a central processing unit (CPU) and a field-programmable gate array (FPGA). The movable device 13 is, for example, a micro electro mechanical systems (MEMS) device that includes a reflecting surface 14 and that can move the reflecting surface 14. The light-source device 12 is, for example, a laser device that emits a laser beam. The target surface 15 is, for example, a screen.

The control device 11 generates control instructions of the light-source device 12 and the movable device 13 based on acquired optical-scanning information, and outputs drive signals to the light-source device 12 and the movable device 13 based on the control instructions.

The light-source device 12 emits light based on the received drive signal. The movable device 13 moves the reflecting surface 14 in at least one of a uniaxial direction and a biaxial direction, based on the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired. The details of the movable device and the details of the control of the control device according to the embodiment are described later.

Figure 2:
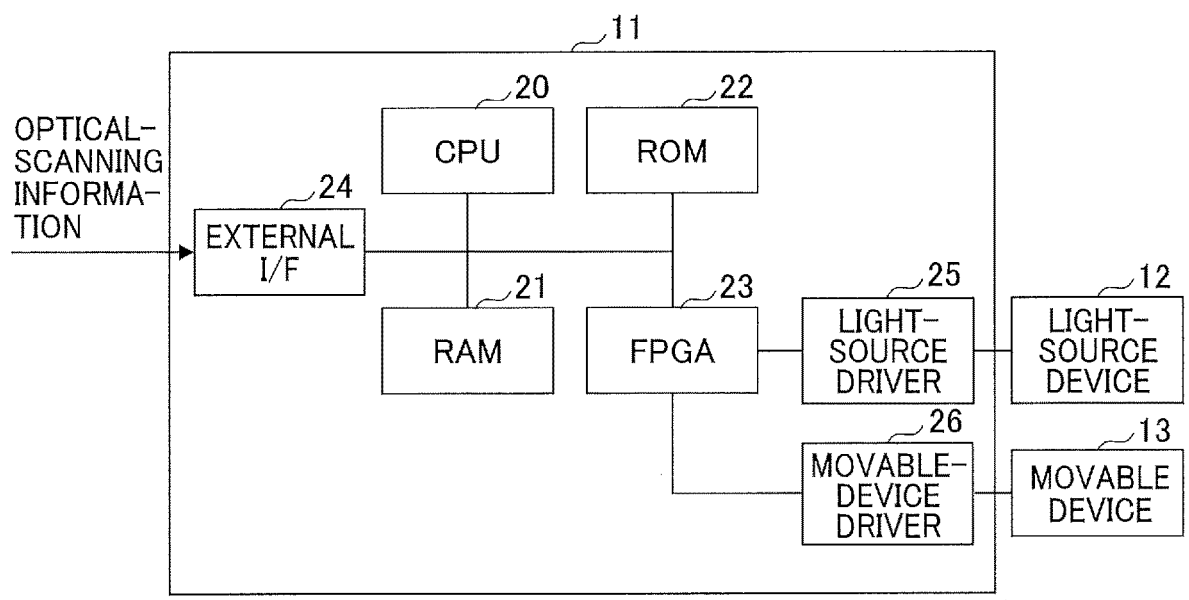
FIG. 2 is a hardware block diagram of an example of the optical scanning system.

Next, the hardware configuration of an example of the optical scanning system 10 is described referring to FIG. 2. FIG. 2 is a hardware configuration diagram of the example of the optical scanning system 10. As illustrated in FIG. 2, the optical scanning system 10 includes the control device 11, the light-source device 12, and the movable device 13, which are electrically connected to one another. The control device 11 includes a CPU 20, a random access memory (RAM) 21, a read only memory (ROM) 22, a FPGA 23, an external interface (I/F) 24, a light-source driver 25, and a movable-device driver 26.

The CPU 20 is an arithmetic device that loads into the RAM 21 a program or data from a storage device such as the ROM 22 and executes processing to provide the controls or functions of the entirety of the control device 11.

The RAM 21 is a volatile storage device that temporarily holds a program and data.

The ROM 22 is a non-volatile storage device that can hold a program and data even after the power is turned off, and stores a program and data for processing that is executed by the CPU 20 to control each function of the optical scanning system 10.

The FPGA 23 is a circuit that outputs proper control signals to the light-source driver 25 and the movable-device driver 26 in accordance with the processing performed by the CPU 20.

For example, the external I/F 24 is an interface with respect to an external device or a network. The external device may be, for example, a host device such as a personal computer (PC); or a storage device, such as a universal serial bus (USB) memory, a secure digital (SD) card, a compact disk (CD), a digital versatile disk (DVD), a hard disk drive (HDD), or a solid state drive (SSD). For example, the network may be a controller area network (CAN) of a vehicle, a local area network (LAN), or the Internet. The external I/F 24 can have any configuration that can achieve connection to an external device or communication with an external device. The external I/F 24 may be provided for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or a network through the external I/F 24. As far as the CPU 20 can acquire the optical-scanning information, the optical-scanning information may be stored in the ROM 22 or the FPGA 23 in the control device 11. Alternatively, a storage device such as a SSD may be additionally provided in the control device 11 and the optical-scanning information may be stored in the storage device.

In this case, the optical-scanning information is information indicating the way of optical scanning to be performed on the target surface 15. For example, the optical-scanning information is image data when an image is displayed by optical scanning. For another example, the optical-scanning information is writing data indicating the order and portion of writing when optical writing is performed by optical scanning. For further example, the optical-scanning information is irradiation data indicating the timing and range of irradiation with light for distance measurement when distance measurement is performed by optical scanning.

The control device 11 can provide the functional configuration described below by using instructions from the CPU 20 and the hardware configuration illustrated in FIG. 2.

Figure 3:
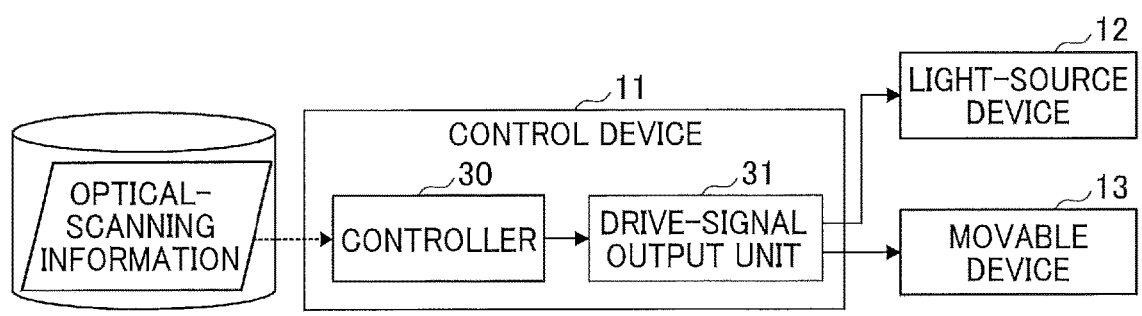
FIG. 3 is a functional block diagram of an example of a control device.

Next, the functional configuration of the control device 11 of the optical scanning system 10 is described below referring to FIG. 3. FIG. 3 is a functional block diagram of an example of the control device 11 of the optical scanning system 10.

As illustrated in FIG. 3, the control device 11 includes a controller 30 and a drive-signal output unit 31 as functions.

The controller 30 is implemented by, for example, the CPU 20, the FPGA 23, and the like. The controller 30 acquires optical-scanning information from an external device, converts the optical-scanning information into a control signal, and outputs the control signal to the drive-signal output unit 31. For example, the controller 30 acquires image data serving as the optical-scanning information from an external device or the like, generates a control signal from the image data through predetermined processing, and outputs the control signal to the drive-signal output unit 31.

The drive-signal output unit 31 is implemented by, for example, the light-source driver 25 and the movable-device driver 26. The drive-signal output unit 31 outputs a drive signal to the light-source device 12 or the movable device 13 based on the received control signal.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal in the movable device 13 is a drive voltage used to control the timing and range of motion where the reflecting surface 14 provided for the movable device 13 is moved.

Figure 4:
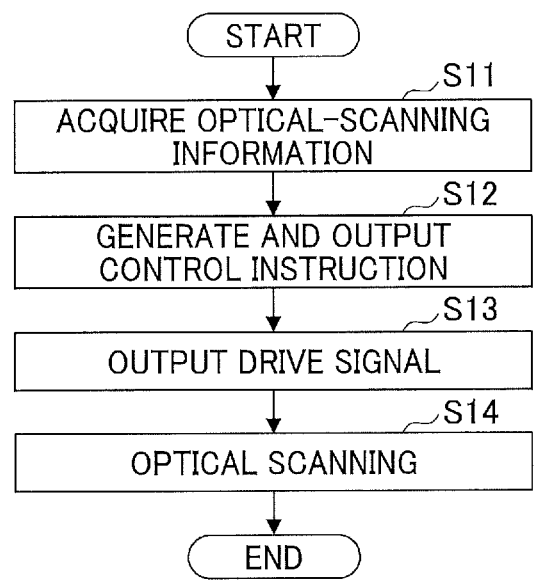
FIG. 4 is a flowchart of an example of processing relating to the optical scanning system.

Next, the process of optically scanning the target surface 15 performed by the optical scanning system 10 is described referring to FIG. 4. FIG. 4 is a flowchart of an example of processing performed by the optical scanning system 10.

In step S11, the controller 30 acquires optical-scanning information from, for example, an external device.

In step S12, the controller 30 generates control signals from the acquired optical-scanning information, and outputs the control signals to the drive-signal output unit 31.

In step S13, the drive-signal output unit 31 outputs drive signals to the light-source device 12 and the movable device 13 based on the received control signals.

In step S14, the light-source device 12 emits light based on the received drive signal. In addition, the movable device 13 moves the reflecting surface 14 based on the received drive signal. The driving of the light-source device 12 and the movable device 13 causes light to be deflected in any desired direction, and optical scanning is performed.

In the above-described optical scanning system 10, a single control device 11 has a device and a function for controlling the light-source device 12 and the movable device 13. However, a control device for the light-source device and a control device for the movable device may be separate elements.

In the above-described optical scanning system 10, a single control device 11 has the functions of the controller 30 and the functions of the drive-signal output unit 31 for the light-source device 12 and the movable device 13. These functions may be implemented by separate elements. For example, a drive-signal output device including a drive-signal output unit 31 may be provided in addition to the control device 11 including the controller 30. An optical deflection system that performs optical deflection may include the movable device 13 including the reflecting surface 14 and the control device 11 of the above-described optical scanning system 10.

An image projection apparatus, to which the movable device according to the embodiment is applied, is described next in detail referring to FIGS. 5 and 6.

Figure 5:
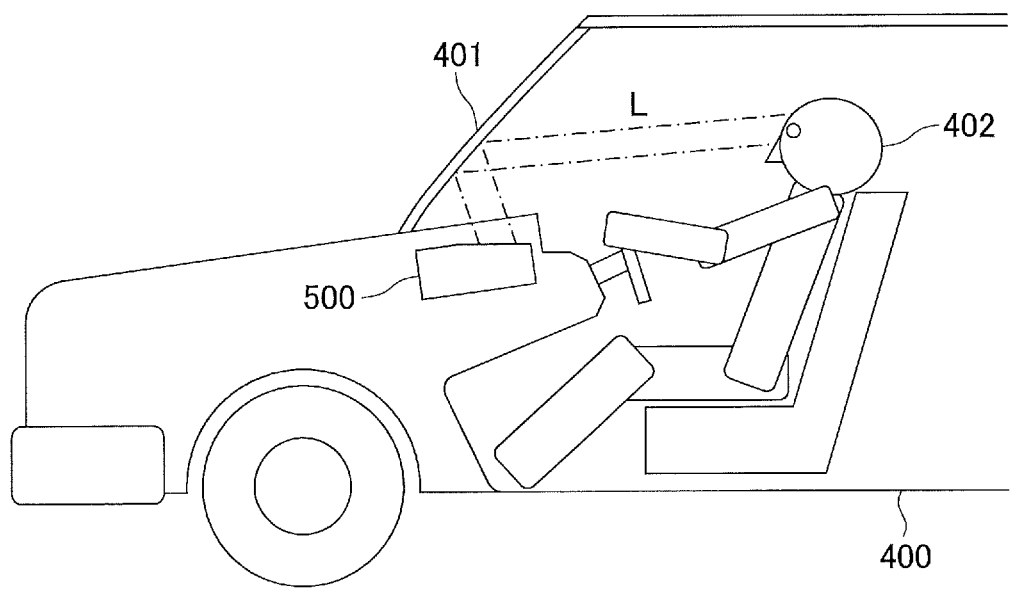
FIG. 5 is a schematic view of an example of a vehicle equipped with a head-up display device (HUD)

FIG. 5 is a schematic view of a vehicle 400 equipped with a HUD 500 as an example of an image projection apparatus according to the embodiment. FIG. 6 is a schematic view of an example of the HUD 500.

The image projection apparatus is an apparatus that projects an image by optical scanning, and is, for example, a HUD.

As illustrated in FIG. 5, for example, the HUD 500 is disposed, for example, near a windshield 401 of the vehicle 400. Projection light L that is emitted from the HUD 500 is reflected by the windshield 401 and directed to an observer (a driver 402) as a user.

Accordingly, the driver 402 can visually recognize an image or the like projected by the HUD 500, as a virtual image. Alternatively, a combiner may be disposed on the inner wall surface of the windshield 401 so that the user can visually recognize a virtual image formed by the projection light that is reflected by the combiner.

Figure 6:
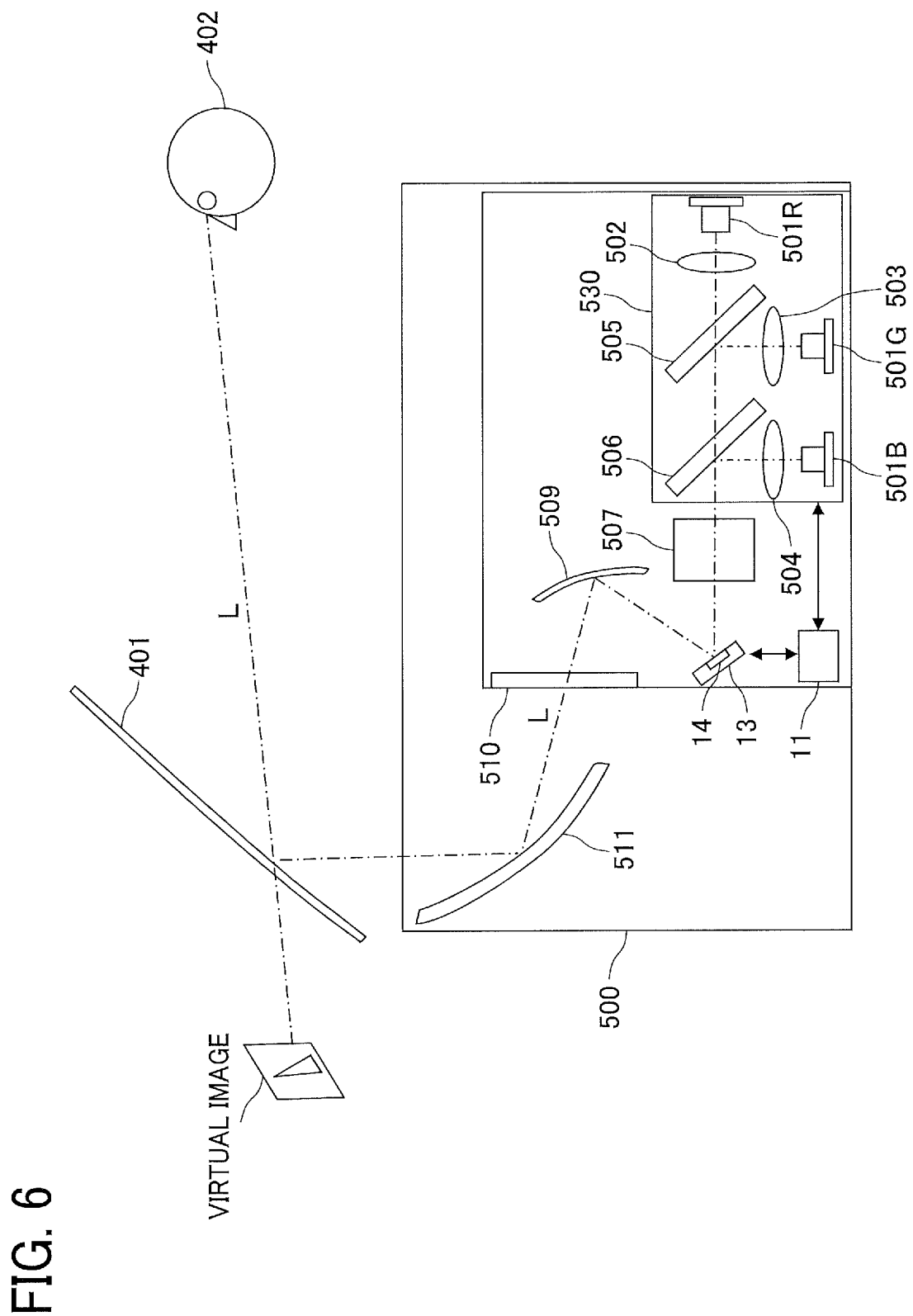
FIG. 6 is a schematic view of an example of the HUD.

As illustrated in FIG. 6, the HUD 500 emits laser beams from red, green, and blue laser-beam sources 501R, 501G, and 501B. The emitted laser beams pass through an incident optical system, and then are deflected by the movable device 13 including the reflecting surface 14. The incident optical system includes collimator lenses 502, 503, and 504 respectively provided for the laser-beam sources 501R, 501G, and 501B, two dichroic mirrors 505 and 506, and a light-intensity adjuster 507. The deflected laser beams pass through a projection optical system, and are projected onto a screen. The projection optical system includes a free-form surface mirror 509, an intermediate screen 510, and a projection mirror 511. In the HUD 500, the laser-beam sources 501R, 501G, and 501B, the collimator lenses 502, 503, and 504, and the dichroic mirrors 505 and 506 are combined as a single unit, that is, a light-source unit 530 in an optical housing.

The HUD 500 projects an intermediate image displayed on the intermediate screen 510 onto the windshield 401 of the vehicle 400 to allow the driver 402 to visually recognize the intermediate image as a virtual image. In the embodiment, the windshield 401 is an example of the light transmissive member.

The laser beams of RGB colors emitted from the laser-beam sources 501R, 501G, and 501B are collimated by the collimator lenses 502, 503, and 504 into approximately parallel beams, and are combined by the two dichroic mirrors 505 and 506. The light intensity of the combined laser beams is adjusted by the light-intensity adjuster 507, and then two-dimensional scanning is performed by the movable device 13 including the reflecting surface 14. The projection light L used for two-dimensional scanning by the movable device 13 is reflected by the free-form surface mirror 509 so as to correct the distortion, and then is collected and focused onto the intermediate screen 510. Accordingly, an intermediate image is displayed. The intermediate screen 510 includes a microlens array in which a plurality of microlenses are two-dimensionally arranged, and enlarges the projection light L incident on the intermediate screen 510 in units of microlens.

The movable device 13 moves the reflecting surface 14 biaxially in a reciprocating manner to perform two-dimensional scanning with the projection light L incident on the reflecting surface 14. The driving of the movable device 13 is controlled in synchronization with the light-emitting timings of the laser-beam sources 501R, 501G, and 501B.

The HUD 500 is described above as an example of the image projection apparatus. However, no limitation is indicated thereby, and the image projection apparatus may be any apparatus that performs optical scanning, using the movable device 13 including the reflecting surface 14, to project an image. For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The image projection apparatus may be incorporated in, not only the vehicle or the wearable member, but also, for example, a mobile object such as an aircraft, a ship, or a mobile robot; or an immobile object such as an operation robot that operates a driving target such as a manipulator without moving from the installed location.

Next, an optical writing device to which the movable device 13 according to an embodiment of the present disclosure is applied is described in detail with reference to FIGS. 7 and 8.

Figure 7:
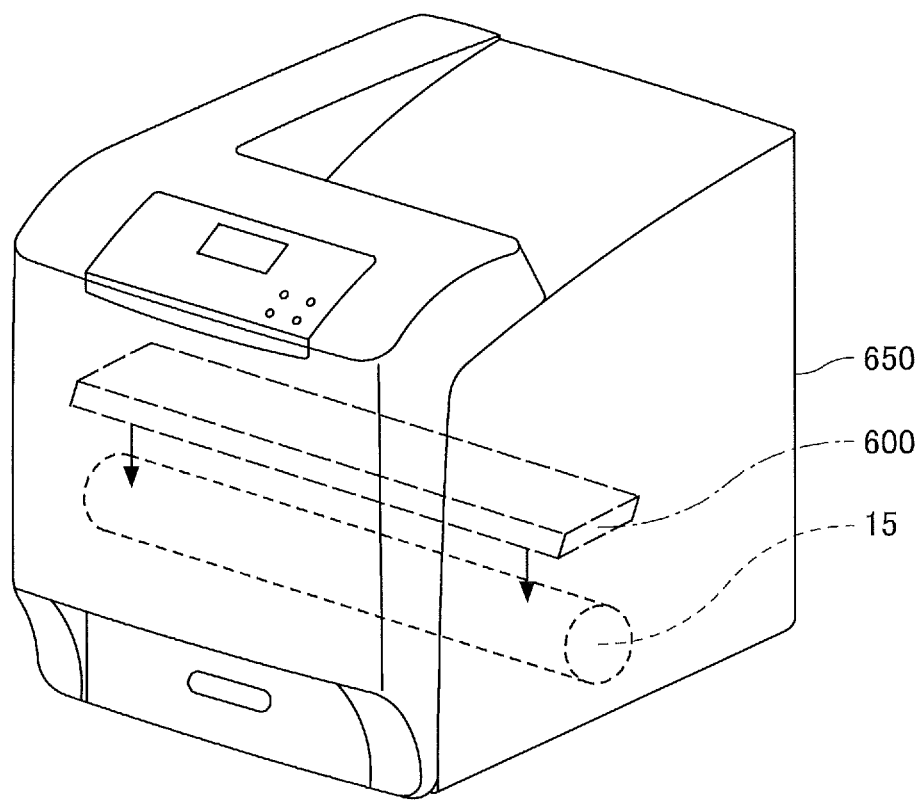
FIG. 7 is a schematic view of an example of an image forming apparatus equipped with an optical writing device.

FIG. 7 illustrates an example of an image forming apparatus equipped with an optical writing device 600. FIG. 8 is a schematic view of an example of the optical writing device 600.

As illustrated in FIG. 7, the optical writing device 600 is used as a component of an image forming apparatus typified by a laser printer 650, for example, having a printer function using laser beams. In the image forming apparatus, the optical writing device 600 performs optical scanning on a photoconductor drum, which is the target surface 15, by using one or more laser beams, thereby performing optical writing on the photoconductor drum.

Figure 8:
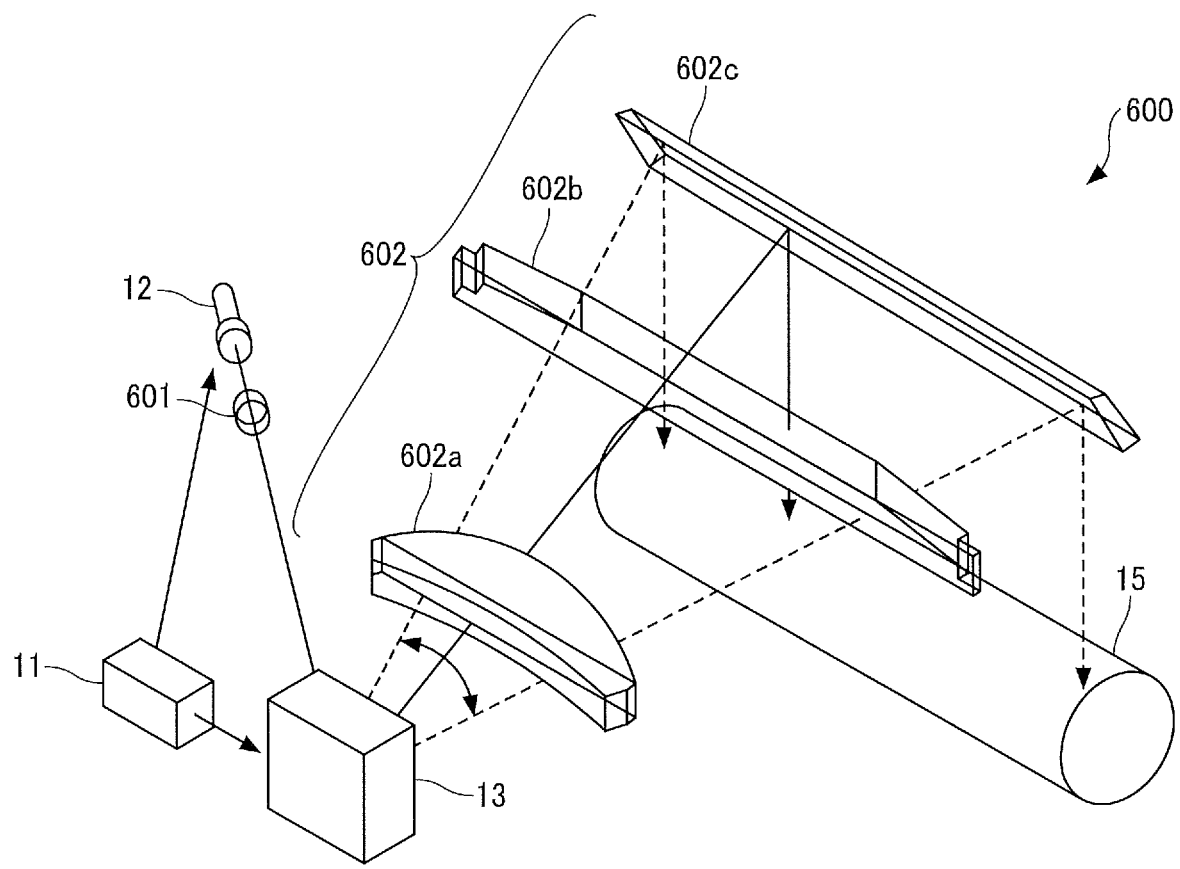
FIG. 8 is a schematic view of an example of the optical writing device.

As illustrated in FIG. 8, in the optical writing device 600, a laser beam from the light-source device 12 such as a laser element passes through an image forming optical system 601 such as a collimator lens and is then deflected uniaxially or biaxially by the movable device 13 having the reflecting surface 14. The laser beam deflected by the movable device 13 then passes through a scanning optical system 602 including a first lens 602a, a second lens 602b, and a reflecting mirror 602c, and is emitted onto the target surface 15 (for example, a photoconductor drum or photosensitive paper), and thereby optical writing is performed. The scanning optical system 602 forms a laser beam in the form of a spot on the target surface 15. The light-source device 12 and the movable device 13 including the reflecting surface 14 are driven based on the control of the control device 11.

As described above, the optical writing device 600 can be used as a component of the image forming apparatus having a printer function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The movable device 13 including the reflecting surface 14 to be applied to the optical writing device is advantageous in saving power of the optical writing device because power consumption for driving the movable device 13 is less than that for driving a rotational polygon mirror or the like. The movable device 13 makes a smaller wind noise when the reflector base oscillates compared with a rotational polygon mirror, and thus is advantageous in achieving low noise of the optical writing device. The optical writing device requires much smaller installation space than the installation space of a rotational polygon mirror, and the amount of heat generated by the movable device 13 is small. Accordingly, downsizing is easily achieved, and thus the optical writing device is advantageous in downsizing the image forming apparatus.

Figure 9:
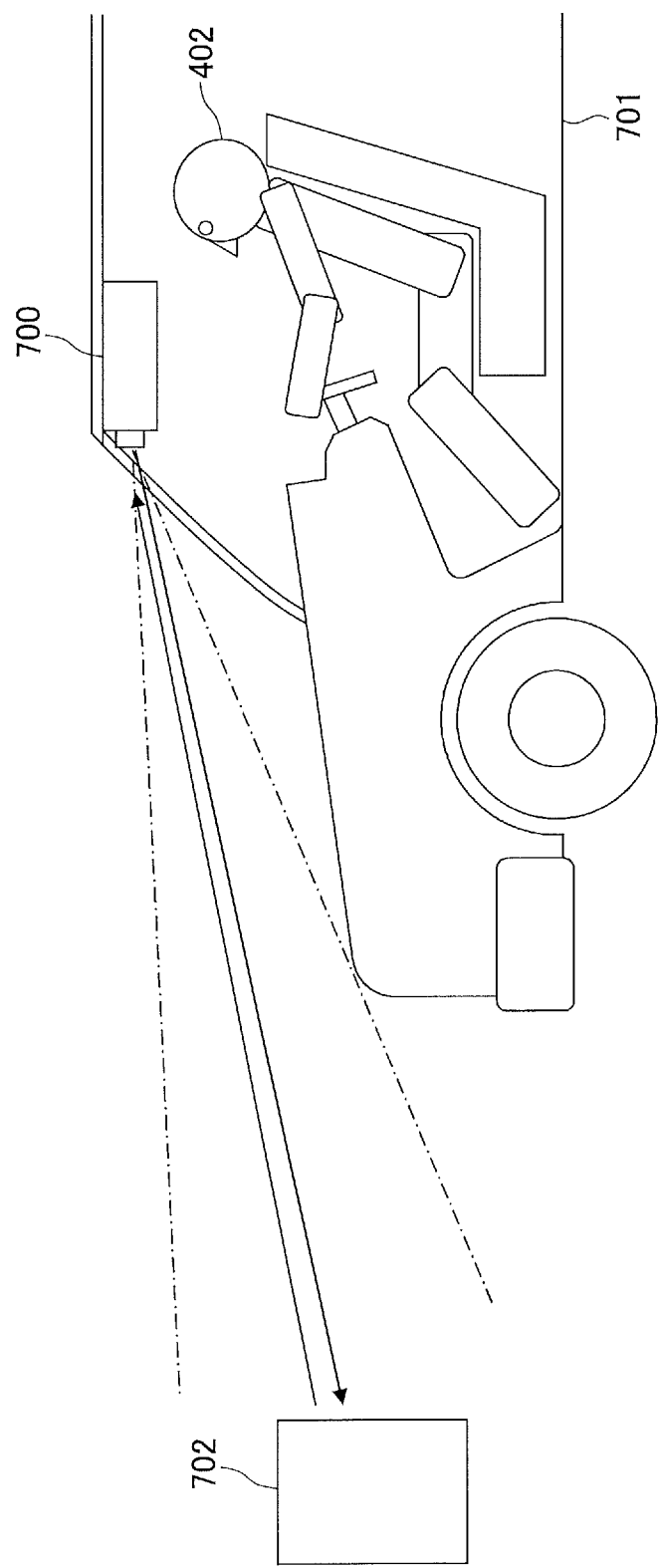
FIG. 9 is a schematic view of another example of a vehicle equipped with a laser imaging detection and ranging (LiDAR) device.
Figure 10:
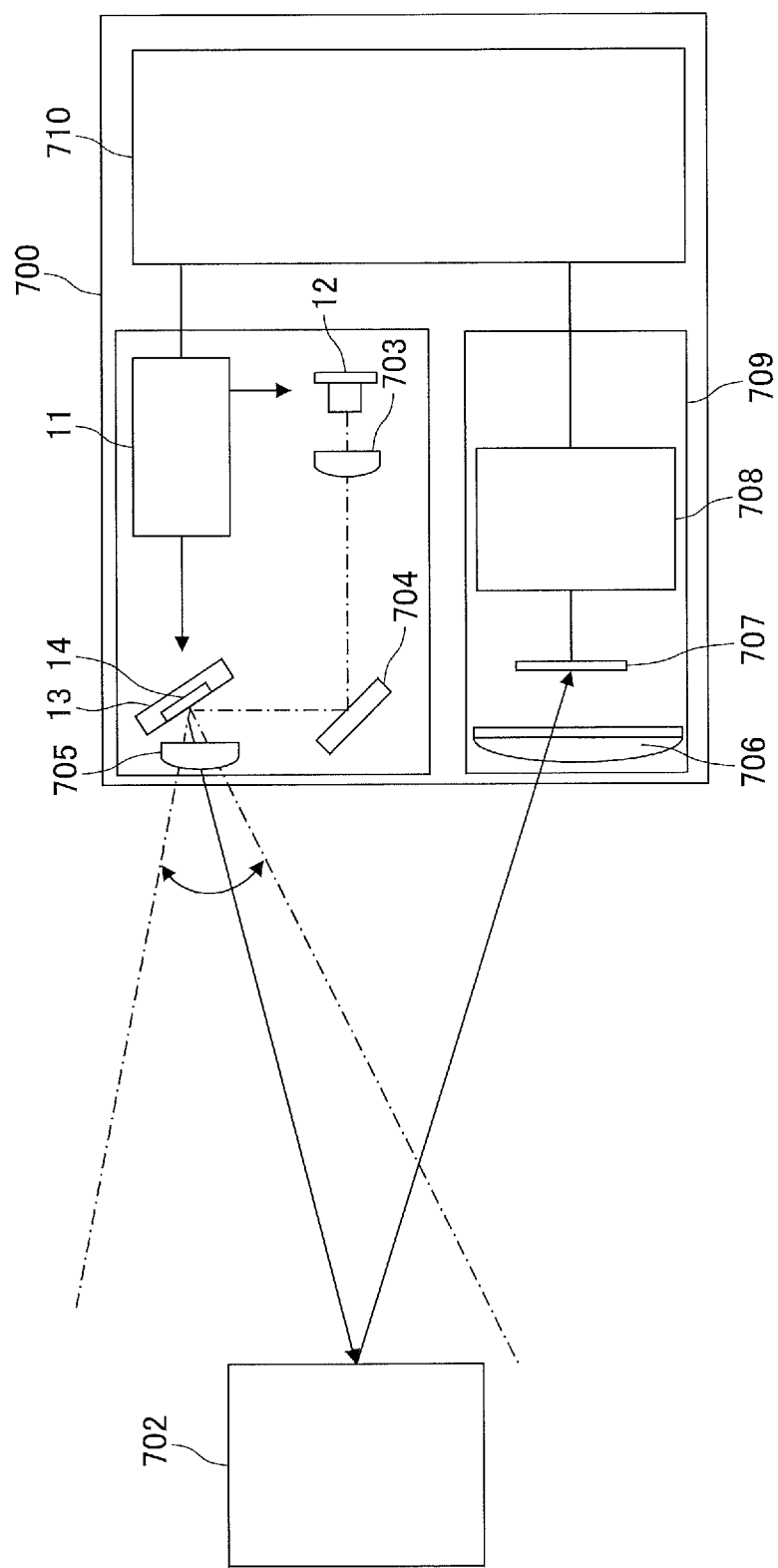
FIG. 10 is a schematic view of an example of the LiDAR device.

Next, a distance measurement device to which the movable device according to the embodiment is applied is described in detail referring to FIGS. 9 and 10.

FIG. 9 is a schematic view of a vehicle equipped with a laser imaging detection and ranging (LiDAR) device as an example of a distance measurement device. FIG. 10 is a schematic view of an example of the LiDAR device.

The distance measurement device is a device that measures a distance in a target direction, and is, for example, a LiDAR device.

As illustrated in FIG. 9, for example, a LiDAR device 700 is mounted on a vehicle 701. The LiDAR device 700 performs optical scanning in a target direction and receives the light reflected from an object 702 that exists in the target direction, to measure the distance from the object 702.

As illustrated in FIG. 10, the laser beams emitted from a light-source device 12 pass through an incident optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system. The driving of the light-source device 12 and the movable device 13 is controlled by the control device 11. The light reflected by the object 702 is detected by a photodetector 709. More specifically, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photodetector 709 receives the laser beams or the phase difference per pixel of the image sensor 707 that have received the laser beams. Moreover, the distance measuring circuit 710 calculates distance information indicating the distance from the object 702.

The movable device 13 including the reflecting surface 14 is less likely broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or absent to measure the distance from the obstacle. The installation position of the LiDAR device 700 is not limited to an upper and front portion of the vehicle 701, and the LiDAR device 700 may be mounted at a side surface or a rear portion of the vehicle 701.

The LiDAR device 700 is described as an example of the distance measurement device. However, no limitation is intended thereby. The distance measurement device may be any device that performs optical scanning by controlling the movable device 13 including the reflecting surface 14, using the control device 11, and that receives the reflected light using a photodetector to measure the distance from the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

Figure 11:
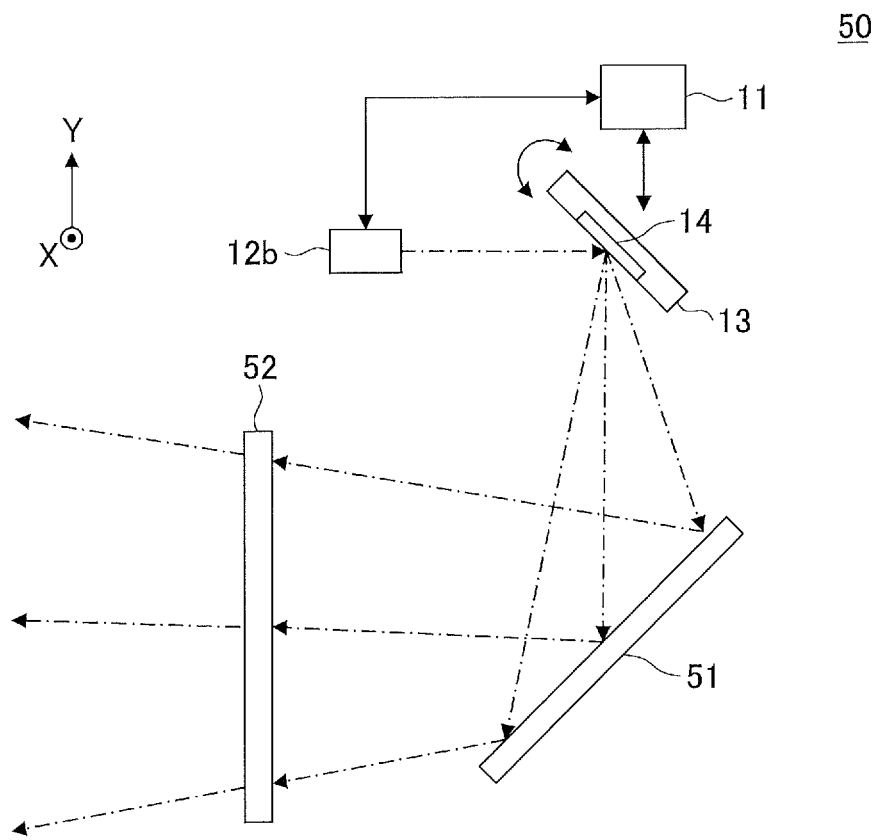
FIG. 11 is a schematic view of an example of a configuration of a laser headlamp.

Next, a laser headlamp 50 in which the movable device of the embodiment is applied to a headlight of a vehicle is described referring to FIG. 11. FIG. 11 is a schematic view of an example of a configuration of the laser headlamp 50.

The laser headlamp 50 includes a control device 11, a light-source device 12*b*, a movable device 13 including a reflecting surface 14, a mirror 51, and a transparent plate 52.

The light-source device 12*b* is a light source that emits a blue laser beam. The laser beam emitted from the light-source device 12*b* is incident on the movable device 13 and is reflected by the reflecting surface 14. The movable device 13 moves the reflecting surface 14 in the XY-direction based on the signal from the control device 11, and performs two-dimensional scanning using the blue laser beam emitted from the light-source device 12*b* in the XY-direction.

The scanning light of the movable device 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Accordingly, the front of the vehicle is illuminated with white light from the transparent plate 52.

The scanning light of the movable device 13 scatters in a predetermined manner as passing through the fluorescent material of the transparent plate 52. Accordingly, glare is attenuated at an illuminated target in the area ahead of the vehicle.

When the movable device 13 is applied to a headlight of a vehicle, the color of light beams from the light-source device 12*b* and the color of the phosphor are not limited to blue and yellow, respectively. For example, the light-source device 12*b* may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the vehicle can be illuminated with white light.

Figure 12:
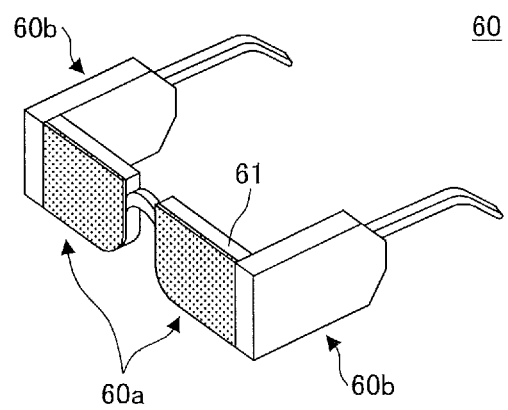
FIG. 12 is a schematic perspective view of an example of a configuration of a head-mounted display (HMD)
Figure 13:
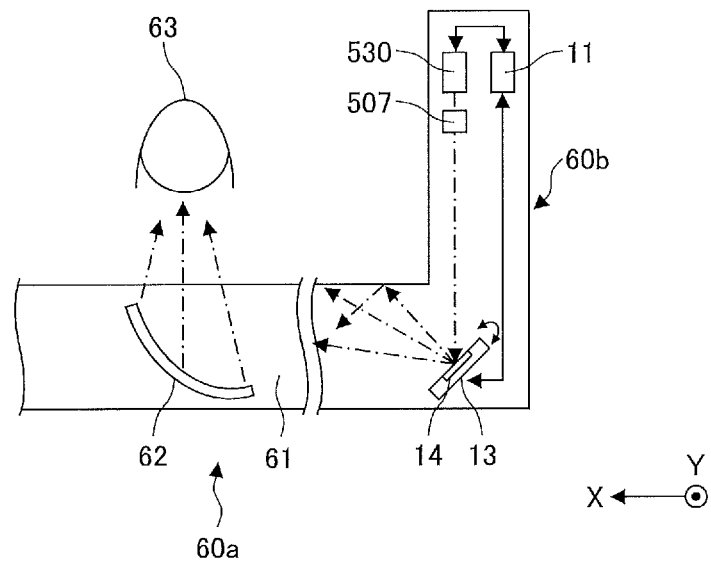
FIG. 13 illustrates an example of a part of the configuration of the HMD.

Next, a head-mounted display (HMD) 60 to which the movable device 13 according to the embodiment is applied is described referring to FIGS. 12 and 13. Note that the HMD 60 is a head-mounted display that can be mounted on a human head, and can be shaped like, for example, glasses.

FIG. 12 is a perspective view of the appearance of the HMD 60. In FIG. 12, the HMD 60 includes a pair of a front 60*a* and a temple 60*b* provided substantially symmetrically on each of the left and right. The front 60*a* can include, for example, a light guide plate 61. An optical system, a control device, and the like, can be incorporated in the temple 60*b*.

FIG. 13 illustrates a partial configuration of the HMD 60. Although the configuration for the left eye is illustrated in FIG. 13, the HMD 60 has a configuration similar to that for the right eye.

The HMD 60 includes a control device 11, a light source unit 530, a light-intensity adjuster 507, a movable device 13 including a reflecting surface 14, a light guide plate 61, and a half mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506. The light source unit 530 emits combined parallel light.

The light intensity of the combined laser beams from the light source unit 530 is adjusted by the light-intensity adjuster 507, and then the light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light of the movable device 13 is incident on the light guide plate 61. The light guide plate 61 guides the scanning light to the half mirror 62 while reflecting the scanning light on the inner wall surface. The light guide plate 61 is formed of a material such as a resin having transparency at the wavelength of the scanning light.

The half mirror 62 reflects the light from the light guide plate 61 to the back side of the HMD 60, and emits the light in the direction of the eyes of a wearer 63 of the HMD 60. The half mirror 62 has, for example, a free-form surface shape. The image of the scanning light is reflected by the half mirror 62, and then is formed on the retina of the wearer 63. The image of the scanning light is formed on the retina of the wearer 63 due to the reflection at the half mirror 62 and the effect of the crystalline lenses of eyeballs. Moreover, due to the reflection at the half mirror 62, the spatial distortion of the image is corrected. The wearer 63 can observe an image formed by the light of scanning in the XY direction.

The wearer 63 observes an image of external light superposed on the image of the scanning light because of the half mirror 62. Alternatively, a mirror may be provided instead of the half mirror 62 so that external light is blocked out and the wearer 63 observes only the image of the scanning light.

Figure 14:
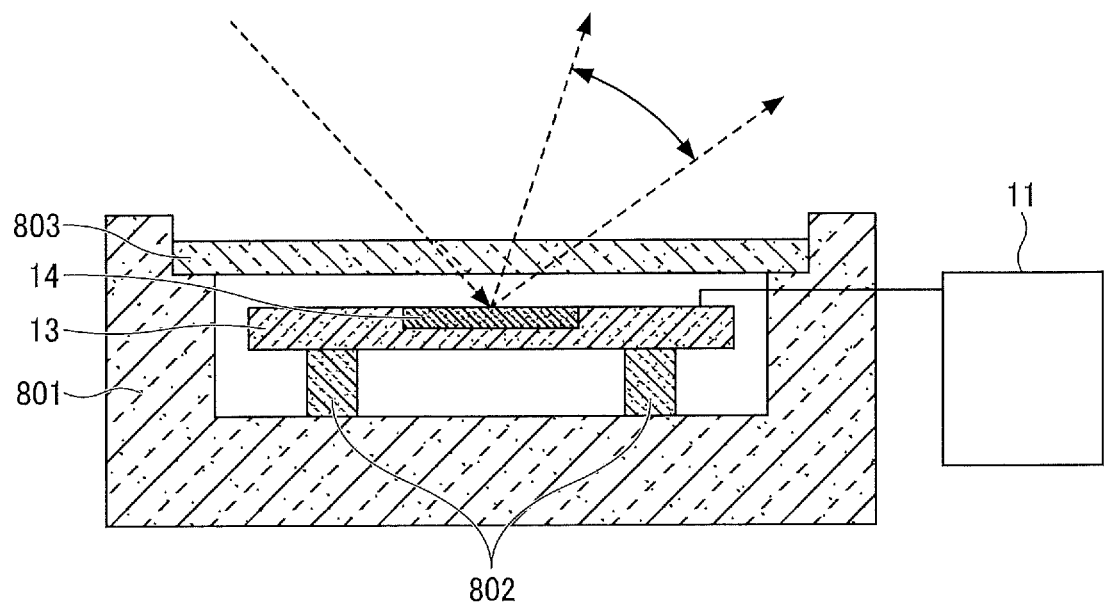
FIG. 14 is a schematic view of an example of a packaged movable device.

Next, packaging of the movable device 13 according to the embodiment is described referring to FIG. 14.

FIG. 14 is a schematic view of an example of a packaged movable device 13.

As illustrated in FIG. 14, the movable device 13 is mounted on a mounting member 802 inside a package member 801. The package member 801 is partly covered with and sealed by a transmissive member 803 so that the movable device 13 is packaged. The package contains inert gas such as nitrogen and is sealed. This configuration can substantially prevent the deterioration of the movable device 13 due to oxidation, and increase the durability against changes in environment such as temperature.

The details of the movable device that is used for the above-described optical deflection system, optical scanning system, image projection apparatus, optical writing device, and distance measurement device, and the details of the control by the control device according to the embodiment are described referring to FIGS. 15 to 19C.

Figure 15:
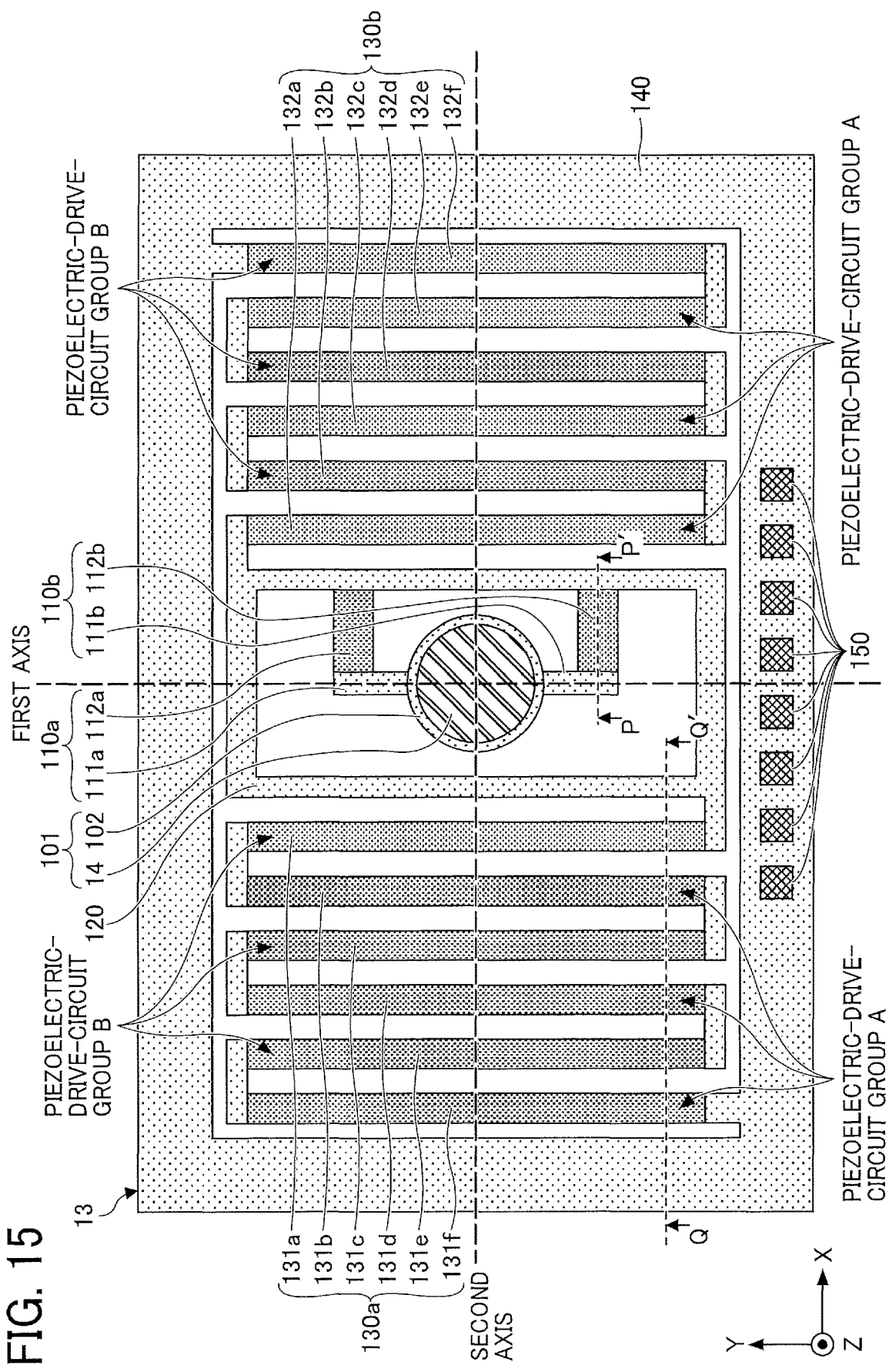
FIG. 15 is a plan view of an example of the movable device when viewed in the +Z direction.
Figure 17:
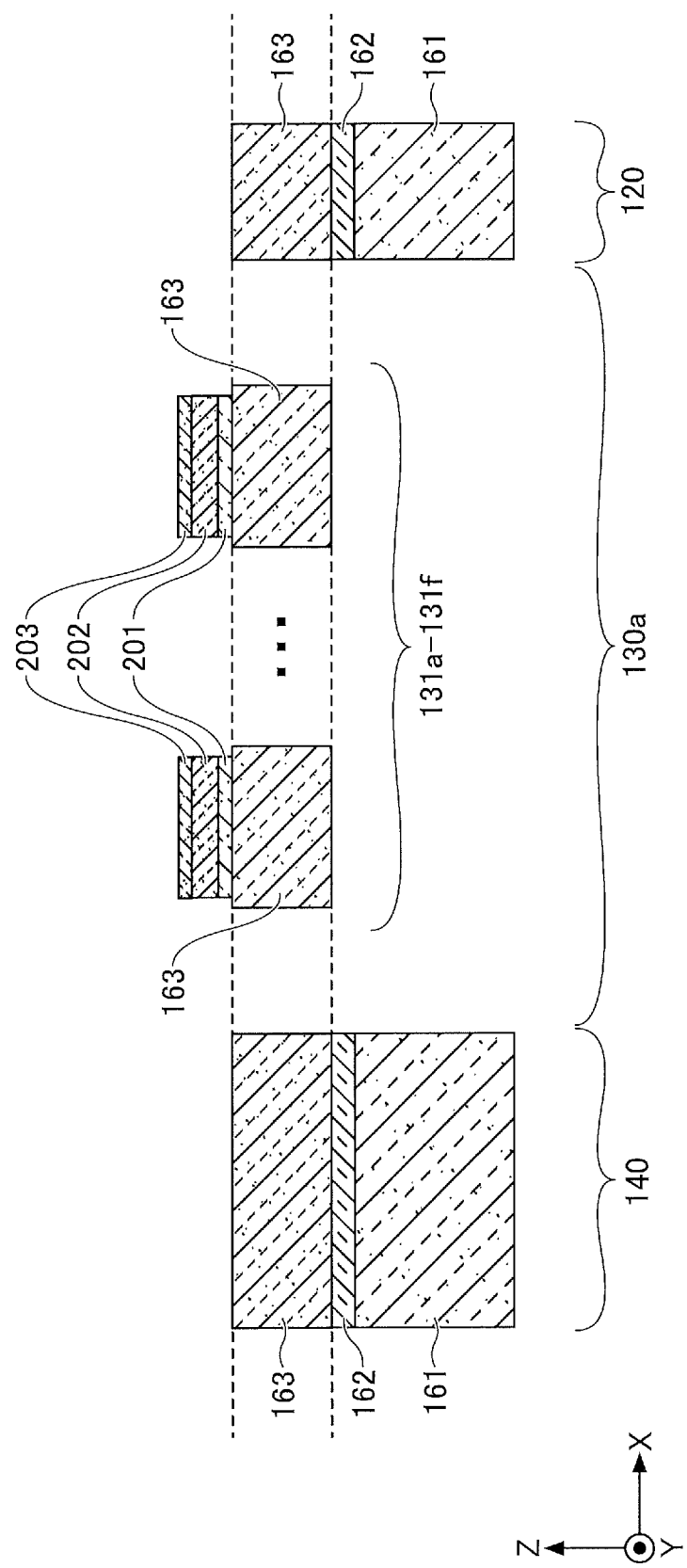
FIG. 17 is a cross-sectional view of the movable device taken along line Q-Q' in FIG. 15.

The movable device is described in detail referring to FIGS. 15 and 17.

Figure 16:
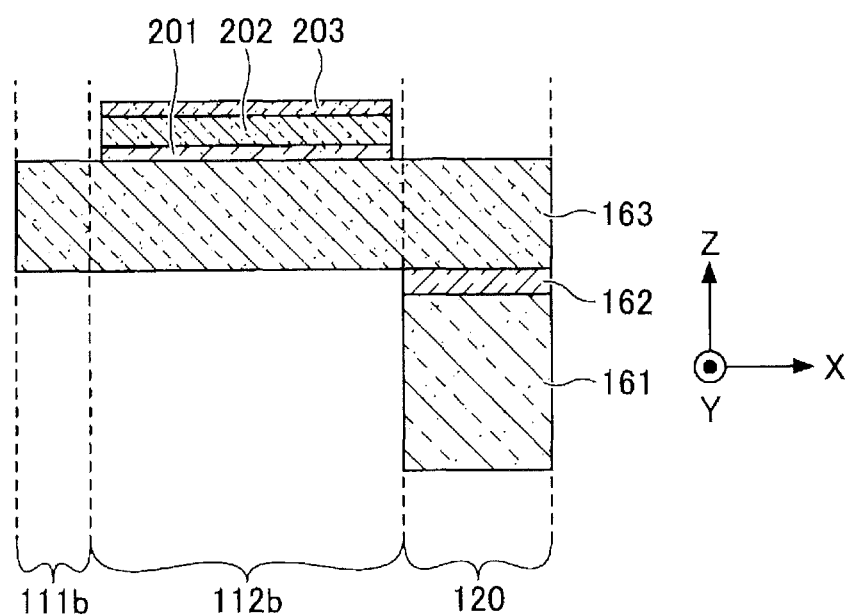
FIG. 16 is a cross-sectional view of the movable device taken along line P-P' in FIG. 15.

FIG. 15 is a plan view of a cantilevered support type movable device capable of deflecting light in two axial directions. FIG. 16 is a cross-sectional view taken along line P-P' in FIG. 15. FIG. 17 is a cross-sectional view taken along line Q-Q' in FIG. 15. However, although the embodiment is described using a cantilever support type movable device, a both-ends support type may be used.

As illustrated in FIG. 15, the movable device 13 includes a reflector 101, first drive circuits 110*a* and 110*b*, a first supporting section 120, second driving circuits 130*a* and 130*b*, a second supporting section 140, and electrode connecting parts 150. The reflector 101 reflects incident light. The first drive circuits 110*a* and 110*b* are connected to the reflector 101 and drive the reflector 101 around a first axis that is parallel to the Y-axis. The first supporting section 120 supports the reflector 101 and the first drive circuits 110*a* and 110*b*. The second drive circuits 130*a* and 130*b* are connected to the first supporting section 120 and drive the reflector 101 and the first supporting section 120 around a second axis that is parallel to the X-axis. The second supporting section 140 supports the second drive circuits 130*a* and 130*b*. The electrode connecting parts 150 are electrically connected to the first drive circuits 110*a* and 110*b*, the second drive circuits 130*a* and 130*b*, and the control device 11. Each of the first drive circuits 110*a* and 110*b* and the second drive circuits 130*a* and 130*b* is an example of the drive beam. Each set of the second drive circuits 130*a* and 130*b* is an example of the serpentine beams. Each of the first supporting section 120 and the second supporting section 140 is an example of the supporting section.

The movable device 13 includes, for example, one silicon on insulator (SOI) substrate that is formed by any appropriate treatment method, such as etching. On the formed SOI substrate, the reflecting surface 14, first piezoelectric drive circuits 112*a*, 112*b*, the second piezoelectric drive circuits 131*a* to 131*f*, and 132*a* to 132*f*, and the electrode connecting parts 150 are formed, which constitutes an integral structure of the above-described components. The above-described multiple components may be formed after the SOI substrate is molded, or may be formed while the SOI substrate is being molded. Each of the first piezoelectric drive circuits 112*a* and 112*b* and the second piezoelectric drive circuits 131*a* to 131*f* and 132*a* to 132*f* is an examples of piezoelectric drive circuit.

The SOI substrate is a substrate in which, on a first silicon layer formed of single crystal silicon (Si), a silicon oxide layer 162 is formed, and on the silicon oxide layer 162, a second silicon layer formed of single crystal silicon is further formed. Hereinafter, the first silicon layer is referred to as silicon support layer 161, and the second silicon layer is referred to as silicon active layer 163.

The silicon active layer 163 has a smaller thickness in the Z-axis direction than the thickness in the X-axis direction or the Y-axis direction. With such a configuration, any member made of the silicon active layer 163 serves as an elastic member having elasticity.

The SOI substrate does not have to be planar, and may have, for example, a curvature. As long as the substrate can be integrally processed by etching or the like and can be partially elastic, the member used for forming the movable device 13 is not limited to the SOI substrate.

The reflector 101 includes, for example, a circular reflector base 102 and the reflecting surface 14 that is formed on the +Z surface of the reflector base 102. The reflector base 102 body includes, for example, the silicon active layer 163. The reflecting surface 14 includes a metal thin film containing, for example, aluminum (Al), gold (Au), or silver (Ag). The reflector 101 may include a rib for strengthening the reflector 101, on the −Z-side surface of the reflector base 102. Such a rib includes, for example, the silicon support layer 161 and the silicon oxide layer 162, serving to prevent the distortion of the reflecting surface 14 due to the motion.

The first drive circuits 110a and 110b include two torsion bars 111a and 111b as an example of a pair of elastic supporting members (bars), and a pair of first piezoelectric drive circuits 112a and 112b as an example of a pair of drive bars. Each one end of the torsion bars 111a and 111b is connected with the reflector base 102, extending along the first axis O1 to support the reflector 101 in a movable manner. One ends of the first piezoelectric drive circuits 112a and 112b are connected with the other ends of the torsion bars 111a and 111b, respectively. The other ends of the first piezoelectric drive circuits 112a and 112b are connected to the inner surface of the first supporting section.

As illustrated in FIG. 16, the torsion bars 111a and 11 b each includes the silicon active layer (the second silicon layer) 163. The first piezoelectric drive circuits 112a and 112b each includes the silicon active layer 163 (the second silicon layer) as the elastic member, a lower electrode 201, a piezoelectric portion 202, and an upper electrode 203. The lower electrode 201, the piezoelectric portion 202, and the upper electrode 203 are formed on the +Z-side surface of the silicon active layer 163. Each of the upper electrode 203 and the lower electrode 201 is made of, for example, gold (Au) or platinum (Pt). For example, the piezoelectric portion 202 is made of lead zirconate titanate (PZT), which is a piezoelectric material.

Referring back to FIG. 15, the first supporting section 120 is, for example, a rectangular support body including the silicon support layer 161, the silicon oxide layer 162, and the silicon active layer 163, and surrounding the reflector 101.

The second driving circuits 130a and 130b include, for example, the plurality of second piezoelectric drive circuits 131a to 131f and 132a to 132f that are joined so as to turn. An end of each of the second driving circuits 130a and 130b is connected to a perimeter zone of the first supporting section 120, and the other end thereof is coupled to an internal circumferential portion of the second supporting section 140. In this case, a position to connect the second drive circuit 130a with the first supporting section 120 and another position to connect the second drive circuit 130b with the first supporting section 120 are symmetric with respect to the center point of the reflecting surface 14. In addition, a position to connect the second drive circuit 130a with the second supporting section 140 and another position to connect the second drive circuit 130b with the second supporting section 140 are symmetric with respect to the center point of the reflecting surface 14. Each of the second piezoelectric drive circuits 131a to 131f and 132a to 132f is an example of a beam.

As illustrated in FIG. 17, the second drive circuits 130a and 130b each include a lower electrode 201, a piezoelectric portion 202, and an upper electrode 203 that are formed in that order on the +Z surface of the silicon active layer 163 that serves as an elastic member. Each of the upper electrode 203 and the lower electrode 201 is made of, for example, gold (Au) or platinum (Pt). For example, the piezoelectric portion 202 is made of lead zirconate titanate (PZT), which is a piezoelectric material.

Referring back to FIG. 15, the supporting section 140 is, for example, a rectangular support body including the silicon support layer 161, the silicon oxide layer 162, and the silicon active layer 163, and surrounding the reflector 101, the first drive circuits 110a, 110b, the first supporting section 120, the second drive circuits 130a and 130b.

The electrode connection part 150 is, for example, formed on the +Z surface of the supporting section 140 and is electrically connected to the upper electrode 203 and the lower electrode 201 of each of the first piezoelectric drive circuits 112a and 112b and the second piezoelectric drive circuits 131a to 131f and the control device 11 via electrode wiring of aluminum (Al) or the like. The upper electrode 203 or the lower electrode 201 may be directly connected to the electrode connection part 150. Alternatively, the upper electrode 203 and the lower electrode 201 may be connected to each other, to be indirectly connected to the electrode connection part 150.

Although this embodiment has illustrated an example in which the piezoelectric portion 202 is formed on a surface (+Z surface) of the silicon active layer 163 serving as the elastic member, the piezoelectric portion 202 may be formed on another surface (for example, −Z surface) of the elastic member, or on both the surface and the other surface of the elastic member.

The shapes of the components are not limited to the shapes in the embodiment as long as the reflector 101 can be driven around the first axis or the second axis. For example, the torsion bars 111a and 111b and the first piezoelectric drive circuits 112a and 112b may have a shape with curvature.

Further, an insulating layer including the silicon oxide layer may be disposed on at least any one of the +Z-side surfaces of the upper electrodes 203 of the first drive circuits 110a and 110b, the first supporting section 120, the upper electrodes 203 of the second drive circuits 130a and 130b, and the second supporting section 140. In this case, electrode wiring is provided on the insulating layer, and the insulating layer is partially removed as an opening or is not formed at a connection spot where the upper electrode 203 or the lower electrode 201 and the electrode wiring are connected, so that the first drive circuits 110a and 110b, the second drive circuits 130a and 130b, and the electrode wiring can be designed with a higher degree of freedom, and furthermore, a short circuit as a result of contact between electrodes can be substantially prevented. The silicon oxide film also serves as an anti-reflection member.

Next, the control by the control device that drives the first drive circuits and the second drive circuits of the movable device is described in detail.

Each of the first drive circuits 110a and 110b and the second drive circuits 130a and 130b includes the piezoelectric portion 202. When voltage that is positive or negative in the direction of polarization is applied to the piezoelectric portion 202, the piezoelectric portion 202 deforms (for example, expands and contracts) according to the electrical potential of the applied voltage, i.e., inverse piezoelectric effects occur. The first drive circuits 110a and 110b and the second drive circuits 130a and 130b move the reflector 101 using the above-described piezoelectric effects.

In this case, the angle defined by the reflecting surface 14 of the reflector 101 with respect to the XY plane when the reflecting surface 14 is inclined to the +Z direction or −Z direction with respect to the XY plane is referred to as deflection angle. In particular, the +Z direction represents a positive deflection angle and the −Z direction represents a negative deflection angle.

First, the control that is performed by the control device to drive the first drive circuit is described.

In the first driving circuits 110a and 110b, when a drive voltage is applied in parallel to the piezoelectric portions 202 included in the first piezoelectric drive circuits 112a and 112b via the upper electrode 203 and the lower electrode 201, the respective piezoelectric portions 202 are deformed. With such deformation of the piezoelectric portion 202, the first piezoelectric drive circuits 112a and 112b bend and deform, which causes the torsion bars 111a and 111b to be twisted. The torsion bars 111a and 111b being twisted apply a drive force to the reflector 101 to rotate around the first axis O1, so that the reflector 101 can move around the first axis. The control device 11 controls the drive voltage applied to the first drive circuits 110a and 110b.

Accordingly, the control device 11 applies a drive voltage with a predetermined sine waveform to the first piezoelectric drive circuits 112a and 112b of the first drive circuits 110a and 110b, and thereby, the reflector 101 can be moved around the first axis in the period of the drive voltage with a predetermined sine waveform.

For example, if the frequency of the sine-waveform voltage is set to about 20 kilohertz (kHz), which is substantially equal to a resonant frequency of the torsion bars 111a and 111b, by using mechanical resonance as a result of the torsion of the torsion bars 111a and 111b, the reflector 101 can be resonated at about 20 kHz.

The control that is performed by the control device to drive the second drive circuit is described below with reference to FIGS. 18A to 18D and 19A to 19C.

FIGS. 18A to 18D are schematic views of a drive operation of the second drive circuit 130b of the movable device 13. Parts indicated by dotted lines are the reflector 101 and other parts. The right side in a view facing the drawing is the +X direction, the upper side in a view facing the drawing is the +Y direction, and the near side in a view facing the drawing is +Z direction.

Figure 18A:
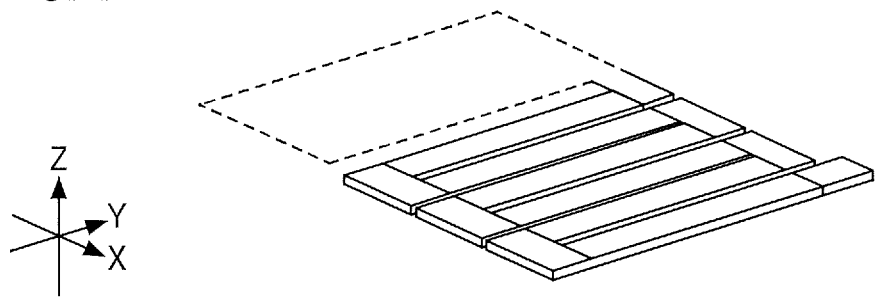
FIGS. 18A to 18D are schematic views when drive beams of the movable device are deformed.

As illustrated in FIG. 18A, the deflection angle by the second drive circuit 130b is zero when the drive voltage is not applied to the second drive circuit 130b.

Figure 18B:
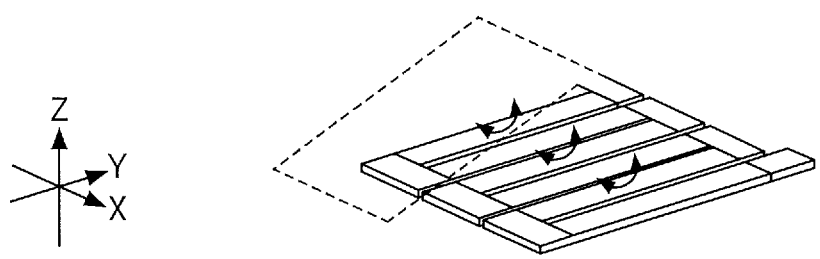

Further, in the second drive circuit 130a including the plurality of second piezoelectric drive circuits 131a through 131f, the second piezoelectric drive circuits 131b, 131 d, and 131f are categorized as a piezoelectric drive circuit group A, each of which is an even-numbered second piezoelectric drive circuit counted from the second piezoelectric drive circuit 131a that is closest to the reflector. In the second drive circuit 130b including a plurality of second piezoelectric drive circuits 132a through 132f, the second piezoelectric drive circuits 132a, 132c, and 132e are also categorized as a piezoelectric drive circuit group A, each of which is an odd-numbered second piezoelectric drive circuit counted from the second piezoelectric drive circuit 132a that is closest to the reflector. As illustrated in FIG. 18B, the piezoelectric drive circuits of the piezoelectric-drive-circuit group A having received the drive voltage applied in parallel bend and deform in the identical direction, so that the reflector 101 rotates in the −Z direction around the second axis.

Further, in the second drive circuit 130a including the plurality of second piezoelectric drive circuits 131a through 131f, the second piezoelectric drive circuits 131a, 131c, and 131e are categorized as a piezoelectric drive circuit group B, each of which is an odd-numbered second piezoelectric drive circuit counted from the second piezoelectric drive circuit 131a that is closest to the reflector. In the second drive circuit 130b including the plurality of second piezoelectric drive circuits 132a through 132f in FIG. 2, the second piezoelectric drive circuits 132b, 132d, and 132f are also categorized as the piezoelectric drive circuit group B, each of which is an even-numbered second piezoelectric drive circuit counted from the second piezoelectric drive circuit 132a that is closest to the reflector. As illustrated in FIG. 18D, the piezoelectric drive circuits of the piezoelectric-drive-circuit group B having received the drive voltage applied in parallel bend and deform in the identical direction, so that the reflector 101 rotates in the +Z direction around the second axis.

As illustrated in FIGS. 18B and 18D, in the second drive circuit 130a or 130b, the plurality of piezoelectric portions 202 of the piezoelectric-drive-circuit group A or the plurality of piezoelectric portions 202 of the piezoelectric-drive-circuit group B concurrently bend and deform. Thus, the movable amount due to bending and deformation is accumulated, thereby increasing the deflection angle of the reflector 101 around the second axis. For example, as illustrated in FIG. 15, the second drive circuits 130a and 130b are coupled to the first supporting section 120 point-symmetrically with respect to the center point of the first supporting section 120. Thus, when the drive voltage is applied to the piezoelectric-drive-circuit group A, a drive force of driving in the +Z direction is generated in the second drive circuit 130a at the coupling portion of the first supporting section 120 and the second drive circuit 130a; and a drive force of driving in the −Z direction is generated in the second drive circuit 130b at the coupling portion of the first supporting section 120 and the second drive circuit 130b. Thus, the movable amount is accumulated and hence the deflection angle of the reflector 101 around the second-axis can be increased.

Figure 18C:
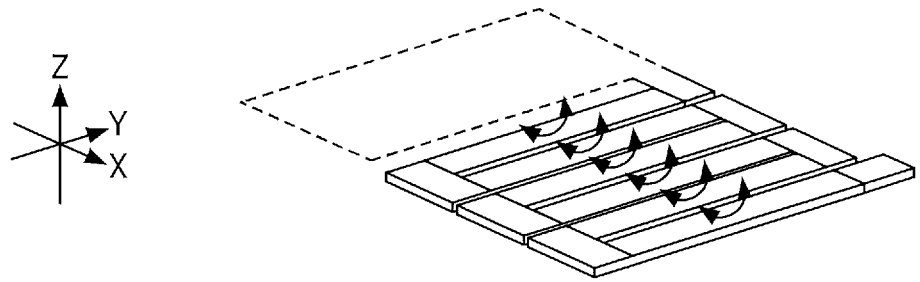
Figure 18D:
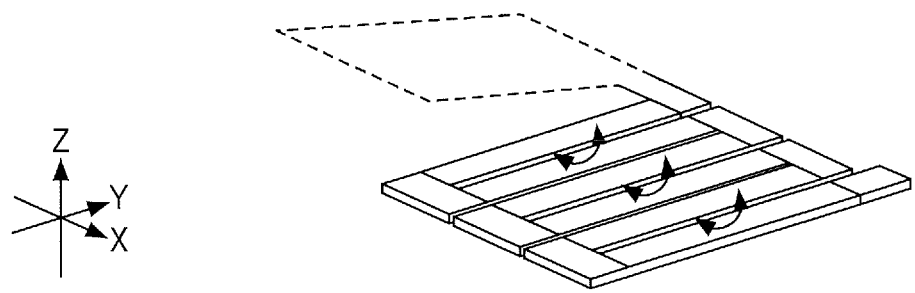

As illustrated in FIG. 18C, the deflection angle is zero when the movable amount of the reflector 101 by the piezoelectric-drive-circuit group A due to voltage application is in balance with the movable amount of the reflector 101 by the piezoelectric-drive-circuit group B due to voltage application.

The drive voltage is applied to the second piezoelectric drive circuits to continuously repeat the situations in FIGS. 18B to 18D. Thus, the reflector can be driven around the second axis.

The control device controls the drive voltage applied to the second drive circuit.

The drive voltage that is applied to the piezoelectric-drive-portion group A (hereinafter, drive voltage A) and the drive voltage that is applied to the piezoelectric-drive-portion group B (hereinafter, drive voltage B) are described referring to FIGS. 19A to 19C.

FIG. 19A is an example of the waveform of the drive voltage A that is applied to the piezoelectric-drive-circuit group A of the movable device. FIG. 19B is an example of the waveform of the drive voltage B that is applied to the piezoelectric-drive-circuit group B of the movable device. FIG. 19C is a view in which the waveform of the drive voltage A and the waveform of the drive voltage B are superposed on each other.

As illustrated in FIG. 19A, the drive voltage A that is applied to the piezoelectric-drive-circuit group A is in a sawtooth waveform and has a frequency of, for example, 60 hertz (Hz). The waveform of the drive voltage A has a preset ratio of TrA:TfA=9:1 where TrA is a time width of a rising duration in which the voltage value increases from a minimum value to a maximum value and TfA is a time width of a falling duration in which the voltage value decreases from the maximum value to a next minimum value. In this case, the ratio of TrA to one cycle is referred to as a symmetry of the drive voltage A.

As illustrated in FIG. 19B, the drive voltage B that is applied to the piezoelectric-drive-circuit group B is in a sawtooth waveform and has a frequency of, for example, 60 Hz. The waveform of the drive voltage B has a preset ratio of TtB to TrB as 9:1 (TfB:TrB=9:1) where TrB is a time width of a rising duration in which the voltage value increases from a minimum value to a maximum value and TfB is a time width of a falling duration in which the voltage value decreases from the maximum value to a next minimum value. In this configuration, the ratio of TfB to one cycle is referred to as a symmetry of the drive voltage B. As illustrated in FIG. 19C for example, a cycle TA of the waveform of the drive voltage A and a cycle TB of the waveform of the drive voltage B are set to be equal to each other.

The sawtooth waveforms of the drive voltage A and the drive voltage B are generated by the superposition of sine waves. In the embodiment, the drive voltages in the sawtooth waveforms are used for the drive voltages A and B; however, no limitation is intended thereby. The waveforms can be changed in accordance with the device characteristics of the movable device. The device characteristics include, for example, a drive voltage with a waveform in which a vertex of a sawtooth waveform is rounded, and a drive voltage with a waveform in which a straight line region of a sawtooth waveform is curved.

Next, a description is given of the deflection angle of the reflector 101 of the movable device 13 when the drive voltage is applied to the optical scanning system 10, with reference to FIGS. 20A, 20B, 21A-1, 21A-2, and 21B.

Figure 20A:
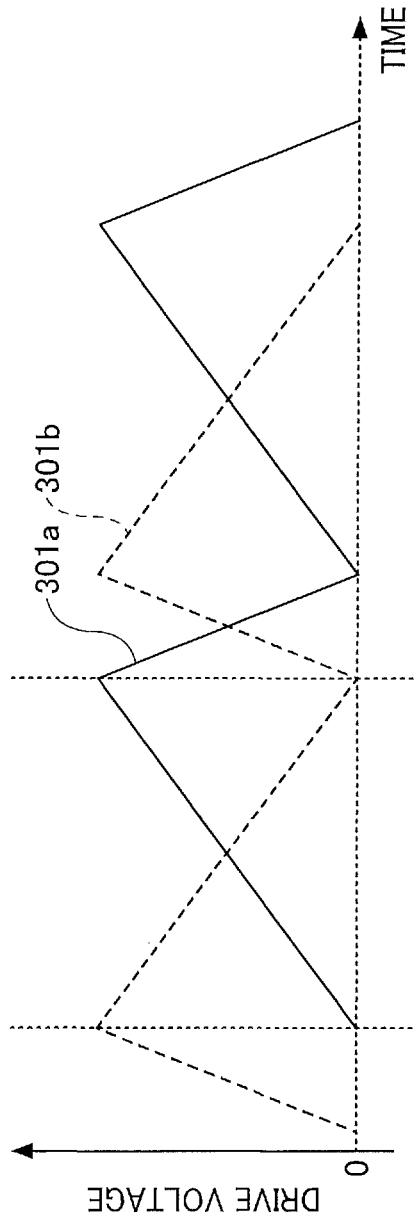
FIG. 20A is a graph for an example of a waveform of a drive voltage.
Figure 20B:
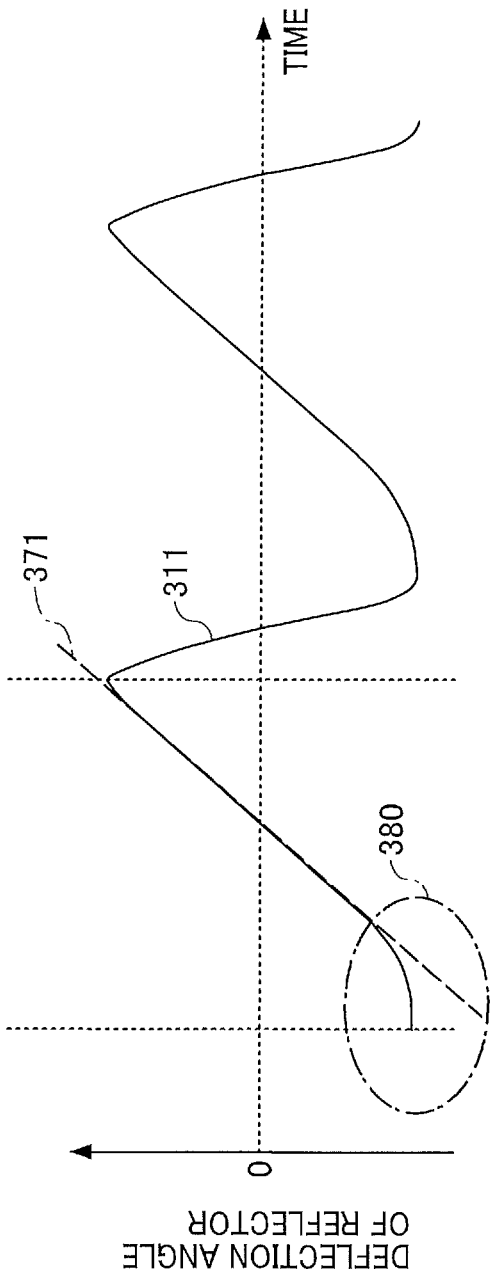
FIG. 20B is a graph for an example of the deflection angle of the reflector when the drive voltage of the waveform in FIG. 20A is applied.

FIG. 20A is a graph for an example of a waveform of a drive voltage, and FIG. 20B is a graph for an example of the deflection angle of the reflector when the drive voltage of the waveform in FIG. 20A is applied. In FIG. 20A, the horizontal axis indicates time, and the vertical axis indicates drive voltage. In FIG. 20B, the horizontal axis indicates time, and the vertical axis indicates deflection angle of the reflector.

FIG. 20A indicates a waveform 301a of the drive voltage A (waveform indicated by solid lines) and a waveform 301b of the drive voltage B (waveform indicated by broken lines). The waveforms 301a and 301b are set to have the same cycle as in FIGS. 19A to 19C. As an example, the waveform 301a is a sawtooth waveform having a symmetry with a ratio of TfA to TrA is 1 to 4 (TfA:TrA=1:4), and the waveform 301b is a sawtooth waveform having a symmetry with a ratio of TfB to TrB is 4 to 1 (TfB:TrB=4:1).

FIG. 20B indicates deflection-angle change profile 311 of the reflector 101 when the drive voltage A is applied to the piezoelectric-drive-circuit group A and the drive voltage B is applied to the piezoelectric-drive-circuit-group B. As indicated by dot-and-dash line 371 in FIG. 20B, there is a need for the deflection angle of the reflector 101 to change linearly with time. However, the rotation speed of the reflector 101 decreases at angles near the maximum deflection angle, that is, angles at which the direction of deflection is reversed. Accordingly, a deflection-angle error occurs such that the deflection-angle change profile 311 may deviate from the linear (i.e., dot-and-dash line 371) as illustrated in the time period surrounded by a circle 380 of a two-dot chain line. As a result, an image projection apparatus incorporating the optical scanning system 10 might cause image failure such as image distortion in the projected image.

Figures 1, 21A:
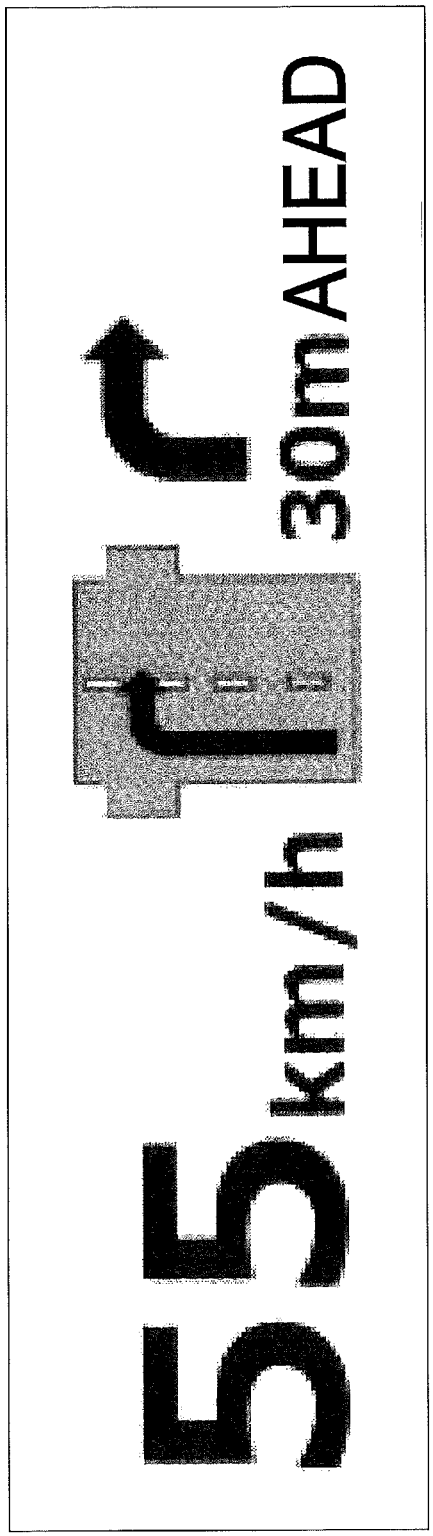
Figures 2, 21A:
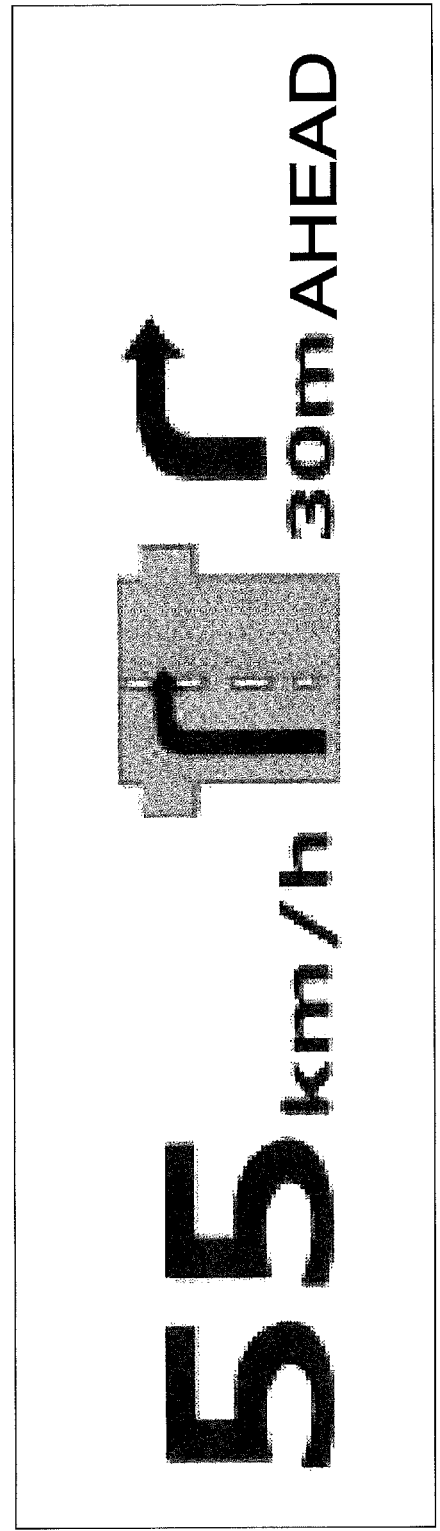

FIGS. 21A-1 and 21A-2 are illustrations of examples of image failure due to deflection-angle errors of the reflector, FIG. 21A-1 illustrating an example of an image formed by optical scanning light and FIG. 21-2 illustrating an example of an image formed by optical scanning light when a deflection-angle error occurs. FIG. 21A indicates an image projected from the HUD 500 described referring to FIGS. 5 and 6 onto the windshield 401 of the vehicle 400 and visually recognized by the driver 402.

The image to be visually recognized by the driver is as illustrated in FIG. 21A-1. However, in an image of FIG. 21A-2, image distortion due to the deflection-angle error occurs at areas in proximity to the upper end and the lower end of the image. Specifically, a decrease in the rotation speed of the reflector 101 in the Y-direction reduces the interval of pixels of the image in the Y-direction in partial areas in proximity to the upper end and the lower end of the image. Thus, the image is contracted in the Y-direction.

Such a deflection-angle error is caused by a linearity error such that the piezoelectric portions (the piezoelectric elements) of the piezoelectric-drive-circuit groups fail to linearly displace (deform) with respect to applied voltage.

Figure 21B:
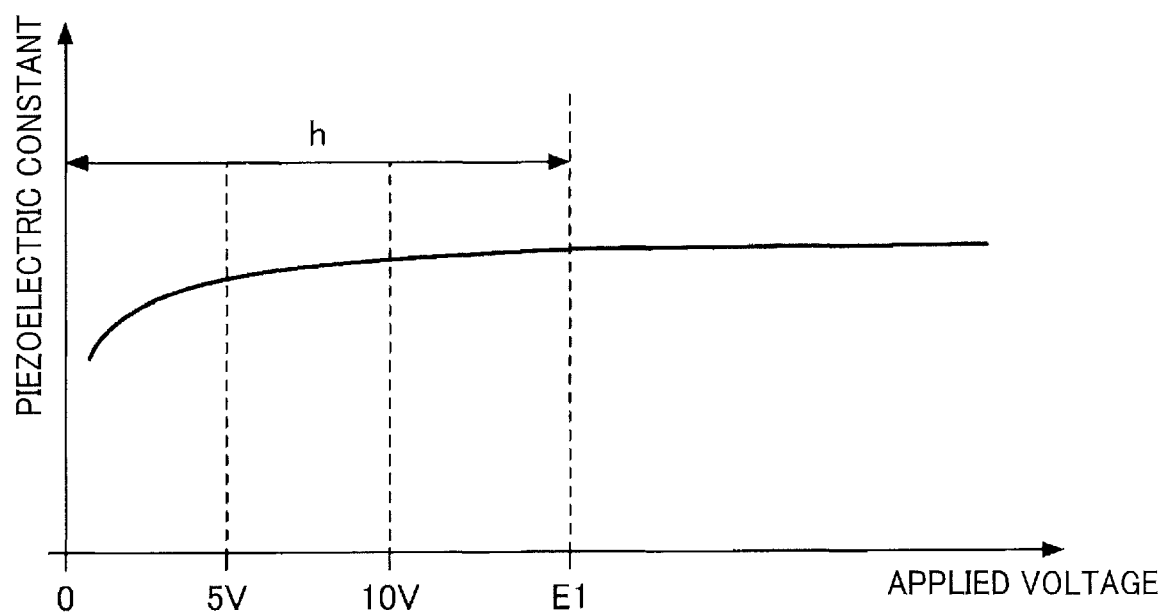
FIG. 21B is a graph for an example of the voltage dependence of the piezoelectric constant of the piezoelectric portion.

The following describes the reasons for such a deflection-angle error. FIG. 21B is a graph for an example of the voltage dependence of the piezoelectric constant of the piezoelectric portion. In FIG. 21B, the horizontal axis indicates applied voltage, and the vertical axis indicates piezoelectric constant. The voltage dependence of the piezoelectric constant is also referred to as a piezoelectric constant curve.

The piezoelectric constant can be calculated in the following manner. A piezoelectric portion made of PZT is formed on the +Z surface of the elastic member made of a silicon active layer of a length L, and the elastic member is bent and deformed by applying a voltage to the upper and lower sides of the piezoelectric portion. Then, the amount K of displacement at the end of the elastic member is measured using a laser Doppler vibrometer while changing the amount of applied voltage. Using the measured amount ΔK of displacement at the end of the elastic member and the following equation (1), a piezoelectric constant d31 is calculated with respect to the applied voltage. The piezoelectric constant d31 is a constant indicating the degree of changeability of the piezoelectric portion when the voltage E is applied.

[Formula 1]

$$\Delta K = \frac{3L^2}{2T_{PZT}} \cdot \frac{2AB(1+B)}{A^2B^4 + 2A(2B+3B^2+2B^3)+1} \cdot d_{31} \cdot E \quad (1)$$

In equation (1), ΔK denotes the amount of displacement of the end of the elastic member, L denotes the length of the elastic member, TPZT denotes the thickness of the PZZT, d31 denotes the piezoelectric constant, E denotes the electric field to be applied to the PZT, A denotes a constant calculated from a ratio of ESi (Young's modulus of Si) to EPZT (Young's modulus of PZT), and B denotes a ratio of TSi (the thickness of Si of the elastic member) to TPZT (the thickness of PZT).

In the embodiment, L of 3500 μm, TPZT of 2 μm, ESi of 170 GPa, EPZT of 90 GPa, TSi of 40 μm were used as parameters so as to obtain the piezoelectric constant d31. As illustrated in FIG. 21B, the piezoelectric constant of the piezoelectric portion 202 is not constant (variable) when the applied voltage is 0V to 10V, and the piezoelectric constant becomes substantially constant when the applied voltage is 10V or more. In particular, when the applied voltage is 0V to 5V, the piezoelectric constant significantly changes.

This is presumably because the PZT constituting the piezoelectric portion 202 is formed by sputtering or a sol-gel method using spin coating. In typical, the PZT formed by such a method generally does not have a constant piezoelectric constant until the applied voltage reaches a predetermined value. That is, the degree of the deformability of the piezoelectric portion changes with the applied voltage. Thus, the piezoelectric constant is variable.

For this reason, when the voltage value of the drive voltage applied to the piezoelectric portion 202 repeatedly rises and falls during the time period from 0 to E1 in one cycle of the range h of the voltage value of the applied voltage as illustrated in FIG. 21B, the piezoelectric portion 202 does not deform in proportion to the voltage value in the low-voltage range in which the voltage value of the applied voltage is approximately 0 and the voltage constant significantly changes. That is, in the low-voltage range in which the voltage value is approximately 0, the uniformity of the speed of the reflector 101, in which the drive voltage is applied to the piezoelectric portion 202, cannot be maintained when the deflection angle of the reflector 101 is near the maximum deflection angle. This might cause image distortion as illustrated in FIG. 21A-2.

To avoid such a situation, in the optical scanning system (the light deflection device) according to the first embodiment, the waveform of the drive voltage A applied to the piezoelectric-drive-circuit group A and the waveform of the drive voltage B applied to the piezoelectric-drive-circuit group B are corrected, thereby reducing or eliminating the voltage dependence of the piezoelectric constant of the piezoelectric element. The light deflecting device according to the first embodiment is described below.

First Embodiment

First, a method of correcting the waveform of the drive voltage of the light deflection device according to the present embodiment is described with reference to FIGS. 22A, 22B, and 22C.

Figure 22A:
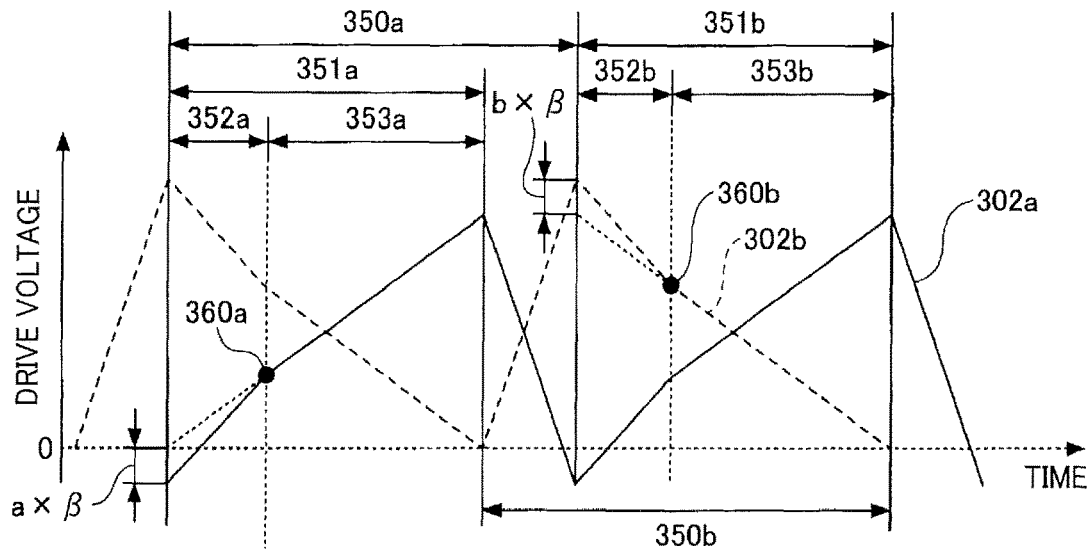
FIGS. 22A, 22B, and 22C are illustrations for describing a method of correcting the waveform of the drive voltage and its effects in the first embodiment, FIG. 22A illustrating an example of a corrected waveform of the drive voltage after correction, FIG. 22B illustrating an example of the deflection angle of the reflector when the drive voltage with a waveform prior to the correction is applied, and FIG. 22C illustrating an example of the deflection angle of the reflector when the drive voltage with the corrected waveform is applied.
Figure 22B:
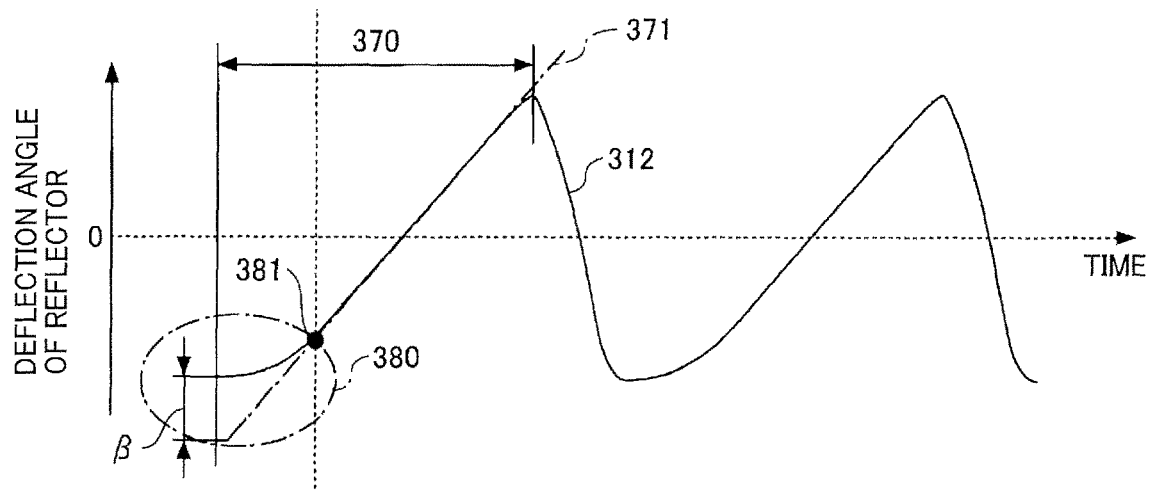
Figure 22C:
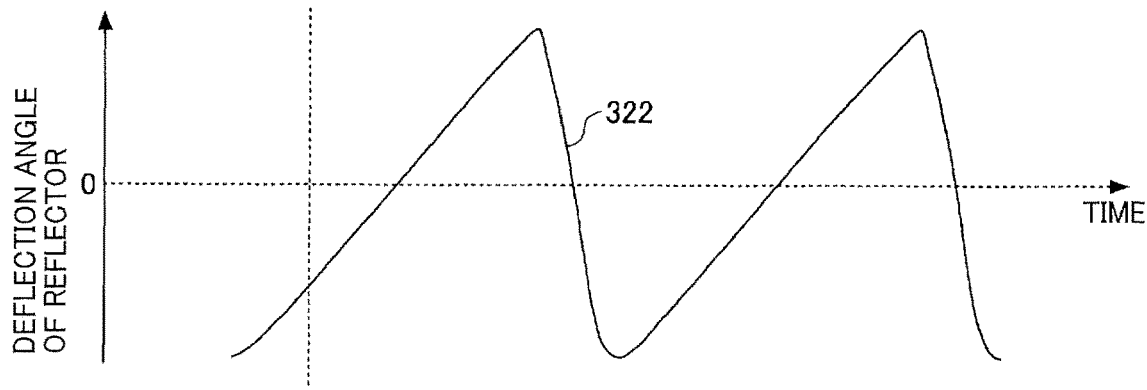

FIGS. 22A, 22B, and 22C are illustrations for describing a method of correcting the waveform of the drive voltage and its effects in the first embodiment, FIG. 22A illustrating an example of a corrected waveform of the drive voltage after correction, FIG. 22B illustrating an example of the deflection angle of the reflector when the drive voltage with a waveform prior to the correction is applied, and FIG. 22C illustrating an example of the deflection angle of the reflector when the drive voltage with the corrected waveform is applied.

FIG. 22A indicates a waveform 302a of the drive voltage A (waveform indicated by solid lines) and a waveform 302b of the drive voltage B (waveform indicated by broken lines). In FIG. 22A, the waveforms 302a and 302b are indicated for two cycles.

In the waveform 302a, a period 350a corresponds to one cycle of the waveform 302a. Further, a period 351a is a period (waveform period) of a positive slope (tilt angle) within one cycle of the waveform 302a. This "slope" refers to the slope of changes in the voltage with time in the waveform. Further, the "positive slope" refers to a slope of increasing voltage, and a "negative slope" refers to a slope of decreasing voltage.

A time 360a indicates a time at which the slope changes from the first slope to the second slope in the period 351a. A period 352a is a period of the first slope, and a period 353a is a period of the second slope of the waveform 302a. The time 360a is represented by, for example, a time it takes from a starting time of the waveform 302a, and corresponds to the period 352a.

That is, the period 352a of the first slope and the period 353a of the second slope constitute the period 351a of the positive slope within one cycle of the waveform 302a. Such a waveform 302a for one cycle is an example of a first drive-voltage waveform.

The waveform 302a is a waveform obtained by correcting the waveform 301a of FIG. 20A, and is also a waveform corrected in accordance with the first slop and the time at which the slope changes from the first slope to the second slope, which are determined based on a detected deflection angle (described later) of the reflector 101.

For example, when the drive frequency is 60 Hz, the period 350a is ¹⁄₆₀ (second). When the symmetry has a ratio of TfA to TrA as 1:4 (TfA:TrA=1:4), the period 351a is ¹⁄₇₅ (sec). When the period 352a is ¹⁄₃₀₀ (sec), the period 353a is ¹⁄₁₀₀ (sec), and the time 360a is a time at which ¹⁄₃₀₀ (sec) has elapsed from the starting time of the waveform 302a. When the minimum voltage of the drive voltage before correction is 0 V; the minimum voltage after correction is −1 V; and the maximum voltage is 5 V, the first slope is 675 (V/sec), and the second slope is 375 (V/sec).

In the waveform 302b, a period 350b corresponds to one cycle of the waveform 302b. Further, a period 351b is a period of a negative slope within one cycle of the waveform 302b.

A time 360b indicates a time at which the slope changes from the third slope to the fourth slope in the period 351b. A period 352b is a period of the third slope, and a period 353b is a period of the fourth slope of the waveform 302b. The time 360b is represented by, for example, a time it takes from a starting time of the waveform 302b, and corresponds to the period 352b.

That is, the period 352b of the third slope and the period 353b of the fourth slope constitute the period 351b of the positive slope within one cycle of the waveform 302b. Such a waveform 302b for one cycle is an example of a second drive-voltage waveform.

The waveform 302b is a waveform obtained by correcting the waveform 301b of FIG. 20A, and is also a waveform corrected in accordance with the third slop and the time at which the slope changes from the third slope to the fourth slope, which are determined based on a detected deflection angle (described later) of the reflector 101.

For example, when the drive frequency is 60 Hz, the period 350b is ¹⁄₆₀ (sec). When the symmetry has a ratio of TfB to TrB as 4:1 (TfB:TrB=4:1), the period 351b is ¹⁄₇₅ (sec). When the period 352b is ¹⁄₃₀₀ (sec), the period 353b is ¹⁄₁₀₀ (sec), and the time 360b is a time at which ¹⁄₃₀₀ (sec) has elapsed from the starting time of the waveform 302b. When the minimum voltage of the drive voltage is 0 V; the maximum voltage before correction is 5 V; and the maximum voltage after correction is 6 V, the third slope is −675 (V/sec), and the fourth slope is −375 (V/sec).

FIG. 22B is a graph for deflection-angle changes 312 of the reflector 101 when a drive voltage with the waveforms 301a and 301b before correction (those waveforms have not been corrected) is applied. In FIG. 22B, the deflection-angle changes for two cycles are indicated with respect to the drive voltage. As illustrated in FIG. 22B, the rotation speed of the reflector 101 decreases and the deflection-angle error occurs in the time period indicated by a circle 380 of a two-dot chain line.

To handle such a situation, by using the corrected waveform 302a (after correction), the drive voltage having the waveform with the first slope, whose absolute value is greater than the second slope, is applied within the time period (the period 352a) from the starting time of the waveform 302a to the time 360a. Further, by using the corrected waveform 302b (after correction), the drive voltage having the waveform with the third slope, whose absolute value is greater than the fourth slope, is applied within the time period (the period 352b) from the starting time of the waveform 302ba to the time 360b.

Increasing the absolute value of the slope increases the rotation speed of the reflector 101. Accordingly, using the corrected waveforms 302a and 302b enables cancelling out of the decrease in the rotation speed of the reflector 101 at angles near the maximum deflection angle, that is, angles at which the direction of deflection is reversed.

FIG. 22C is a graph for deflection-angle changes 322 of the reflector 101 when a drive voltage with the waveforms 302a and 302b after correction is applied. As illustrated in FIG. 22C, the deflection-angle error has been cancelled out in the deflection-angle changes 322, and linear deflection-angle changes with time, that is, a constant rotation speed is obtained.

In FIG. 22B, a period 370 is a period in which the deflection-angle changes of the reflector 101 over time has a positive slope. The period 370 corresponds to the periods 351a and 351b. A regression line 371 indicated by a one-dot chain line is a regression line obtained by linearly approximating the detection data of the deflection angles in the period 370. Using the regression line 371 and the detection data of the deflection angles in the period 370, a determination can be made regarding whether a correction of the waveform of the drive voltage is to be performed, as is described later. Note that the detection data of the deflection angles for each time in the regression line 371 is an example of a preset value.

Further, the time 381 is a time at which the difference between the regression line and the detection data of the deflection angle for each time changes to a predetermined threshold value or greater. As will be described later, a waveform correction unit 37 determines the times 360a and 360b based on the time 381.

Further, β in FIG. 22B denotes the maximum deflection-angle error, and "a×β" and "b×β" in FIG. 22A are the amounts of changes in voltage (the voltage-change amounts) of the waveform 302a and the waveform 302b, respectively, to cancel out the maximum deflection-angle error β. These "a×β" and "b×β" are described later.

Next, the movable device 13a for achieving the above-described correction of the waveform of the drive voltage is described with reference to FIGS. 23 and 24. In the following description of FIGS. 23 to 24, the description of the same components as those described above for in FIGS. 15 to 17 is omitted.

Figure 23:
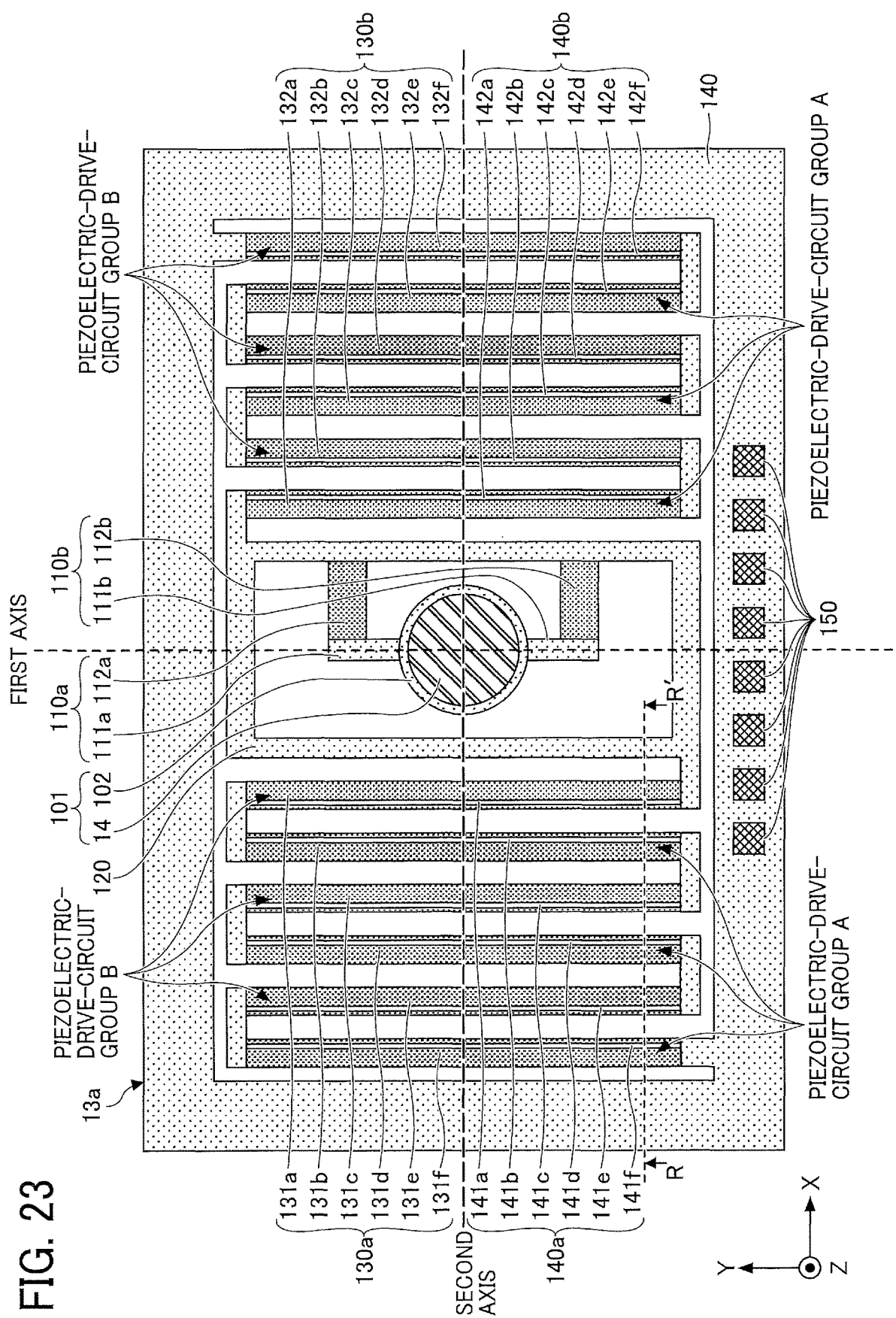
FIG. 23 is a plan view of an example of the movable device according to the first embodiment when viewed in the +Z direction.
Figure 24:
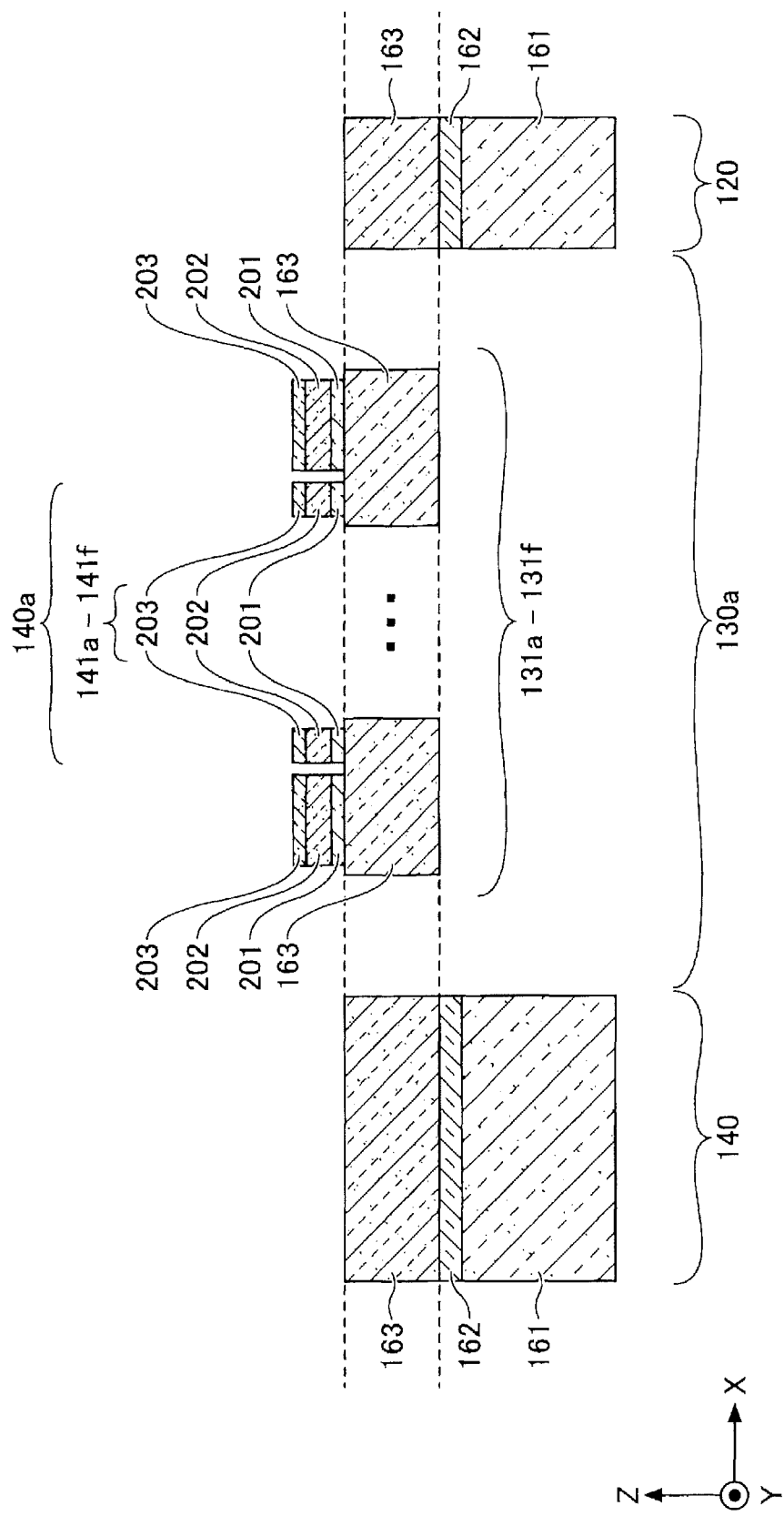
FIG. 24 is a cross-sectional view of the movable device taken along line R-R' in FIG. 23.

FIG. 23 is a plan view of an example of the movable device according to the present embodiment as viewed from the +Z direction, and FIG. 24 is a cross-sectional view taken along line R-R' of the movable device in FIG. 23.

As illustrated in FIG. 23, the movable device 13a includes detection units 140a and 140b. The detection unit 140a includes piezoelectric sensors 141a to 141f, and the detection unit 140b includes piezoelectric sensors 142a to 142f.

The piezoelectric sensor 141a is provided on the silicon active layer of the second piezoelectric drive circuit 131a, the piezoelectric sensor 141b is provided on the silicon active layer of the second piezoelectric drive circuit 131b, and the piezoelectric sensor 141c is provided on the silicon active layer of the second piezoelectric drive circuit 131c. The piezoelectric sensor 141d is provided on the silicon active layer of the second piezoelectric drive circuit 131d, the piezoelectric sensor 141e is provided on the silicon active layer of the second piezoelectric drive circuit 131e, and the piezoelectric sensor 141f is provided on the silicon active layer of the second piezoelectric drive circuit 131f.

Similarly, the piezoelectric sensor 142a is provided on the silicon active layer of the second piezoelectric drive circuit 132a, the piezoelectric sensor 142b is provided on the silicon active layer of the second piezoelectric drive circuit 132b, and the piezoelectric sensor 142c is provided on the silicon active layer of the second piezoelectric drive circuit 132c. The piezoelectric sensor 142d is provided on the silicon active layer of the second piezoelectric drive circuit 132d, the piezoelectric sensor 142e is provided on the silicon active layer of the second piezoelectric drive circuit 132e, and the piezoelectric sensor 142f is provided on the silicon active layer of the second piezoelectric drive circuit 132f.

As illustrated in FIG. 24, same as the second drive circuit 130a, the detection unit 140a includes a lower electrode 201, a piezoelectric portion 202, and an upper electrode 203 that are formed in that order on the +Z surface of the silicon active layer 163 that serves as an elastic member. Each of the upper electrode 203 and the lower electrode 201 is made of, for example, gold (Au) or platinum (Pt). For example, the piezoelectric portion 202 is made of lead zirconate titanate (PZT), which is a piezoelectric material. The piezoelectric portion 202 is an example of a piezoelectric element.

The detection unit 140a is formed such that each of the piezoelectric sensors 141a to 141f has a length substantially equal to the length of each of the second piezoelectric drive circuits 131a to 131f in the Y-direction and has a narrower width than the width of the length of the second piezoelectric drive circuits 131a to 131f in the X-direction. Further, the piezoelectric sensors 141a to 141f of the detection unit 140a are disposed on the +Z-side surface of the silicon active layer such that the piezoelectric sensors 141a to 141f are spaced apart to not contact the second piezoelectric drive circuits 131a to 131f of the second drive circuit 130a. The detection unit 140b has the same structure as that of the detection unit 140a.

The piezoelectric-drive-circuit groups A and B are bent and deformed to move the reflector 101 when the drive voltage is applied to the second drive circuits 130a and 130b. Each of the detection units 140a and 140b detects, as a signal representing the deflection angle of the reflector 101, a voltage generated by the piezoelectric portion 202 as a result of the deformation of the silicon active layer 163 by the second drive circuits 130a and 130b, and outputs the signal to the control device 11a.

Next, a configuration of the light deflection device according to the embodiment is described with reference to FIGS. 25 and 26.

Figure 25:
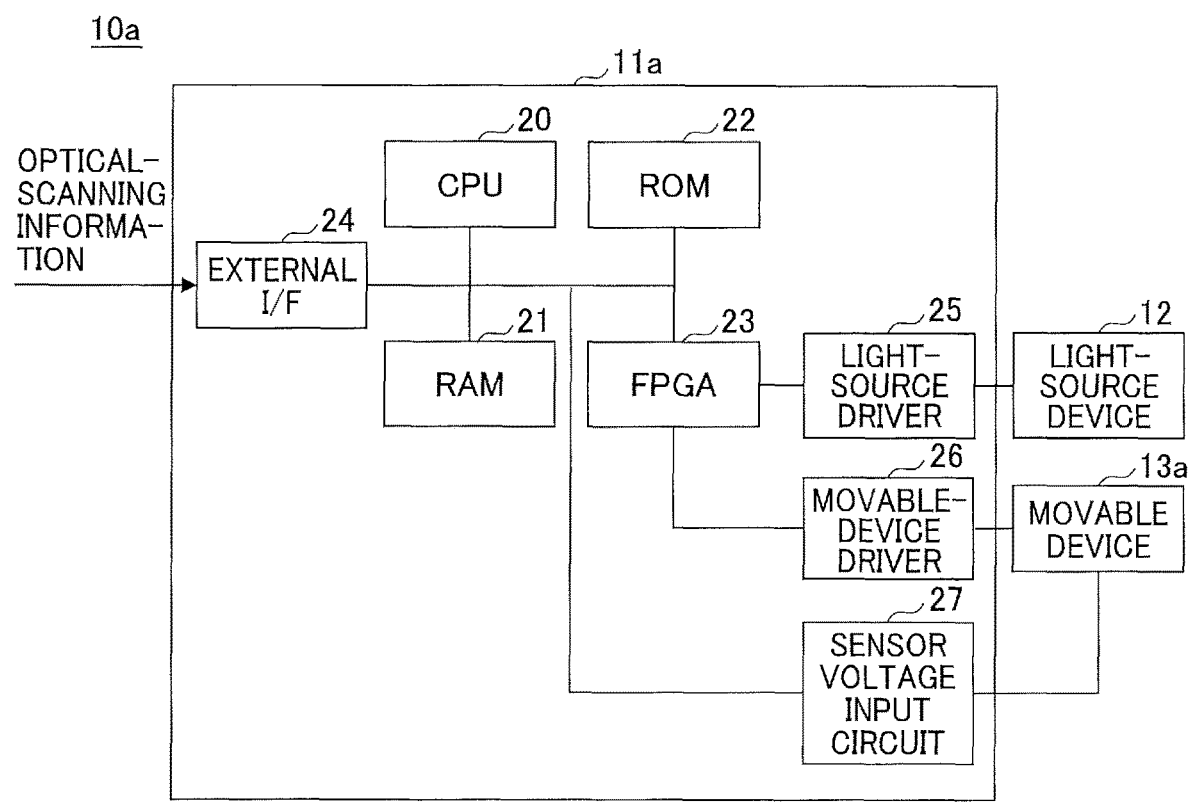
FIG. 25 is a hardware block diagram of an example of a light deflection device according to first embodiment.

FIG. 25 is a hardware block diagram of an example of the light deflection device according to the embodiment.

The light deflection device 10a includes a control device 11a, a light-source device 12, and a movable device 13a, and the control device 11a includes a sensor voltage input circuit 27. The sensor voltage input circuit 27 is an electric circuit that serves as an interface for inputting a voltage generated in the piezoelectric portions 202 of the detection units 140a and 140b to the control device 11a. The sensor voltage input circuit 27 includes, for example, an amplification circuit and an analog-to-digital (A/D) conversion circuit. The amplification circuit amplifies the voltage generated in the piezoelectric portion 202. The A/D conversion circuit converts an analog-voltage signal into a digital-voltage signal. The sensor voltage input circuit 27 outputs the digital-voltage signal, for example, to the CPU.

Figure 26:
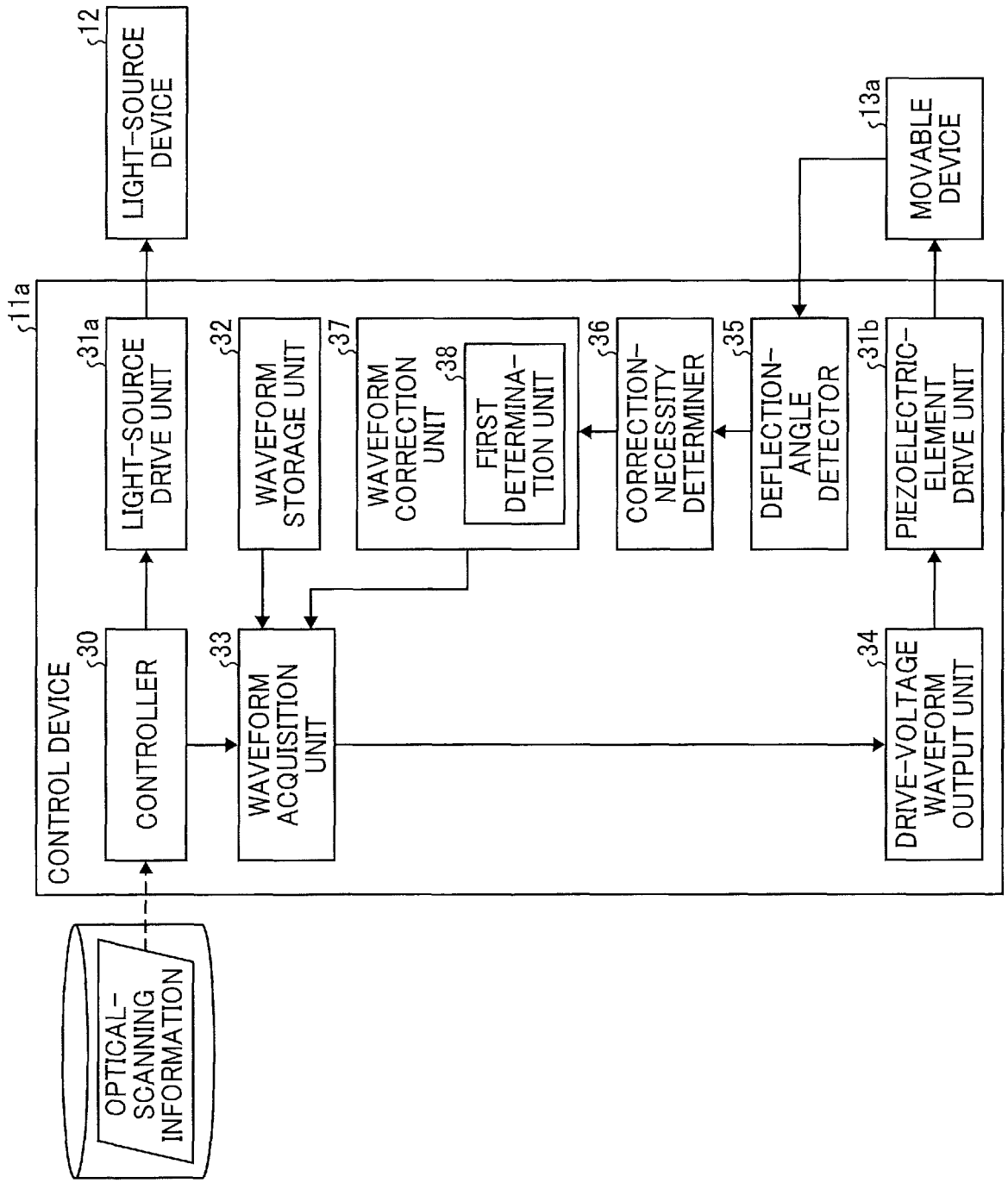
FIG. 26 is a functional block diagram of an example of a control device according to the first embodiment.

Next, FIG. 26 is a functional block diagram of an example of a control device provided in the light deflection device according to the present embodiment.

The control device 11a includes a light-source drive unit 31a, a piezoelectric-element drive unit 31b, a waveform storage unit 32, a waveform acquisition unit 33, a drive-voltage waveform output unit 34, a deflection-angle detector 35, a correction-necessity determiner 36, and a waveform correction unit 37.

The light-source drive unit 31a is implemented by, for example, the light-source driver 25. The light-source drive unit 31a outputs a drive signal of the drive voltage used to control the irradiation timing and irradiation intensity of the light source, to the light-source device 12 based on the control signal output from the controller 30.

The piezoelectric-element drive unit 31b is implemented by, for example, the movable-device driver 26. The piezoelectric-element drive unit 31b outputs a drive signal used to control the rotation timing and rotation range of the reflector 101, to the movable device 13a in accordance with the waveform of the drive voltage output from the drive-voltage waveform output unit 34.

The waveform storage unit 32 is implemented by, for example, the ROM 22. The waveform storage unit 32 stores data indicating the waveforms before correction, such as the waveforms 301a and 301b, of the drive voltage.

The waveform acquisition unit 33 acquires data the waveform (hereinafter, simply referred to as the waveform), referring to the waveform storage unit 32, and temporarily stores the data in, for example, the RAM 21. Further, the waveform acquisition unit 33 reads the waveform temporarily stored in, for example, the RAM 21 and outputs the read waveform to the drive-voltage waveform output unit 34 in accordance with the control signal output from the controller 30. Since the waveform correction unit 37 corrects the waveform temporarily stored in the RAM 21, which is to be described later, the waveform acquisition unit 33 acquires a updated waveform that has been corrected by the waveform correction unit 37 in accordance with the deflection angle of the reflector 101, and outputs the acquired waveform to the drive-voltage waveform output unit 34.

The drive-voltage waveform output unit 34 outputs the received waveform of the drive voltage to the piezoelectric-element drive unit 31b.

The deflection-angle detection unit 35 is implemented by, for example, the sensor voltage input circuit 27. The deflection-angle detector 35 converts the voltage generated in the piezoelectric portions 202 of the detection units 140a and 140b, into a digital-voltage signal, and outputs as the detection data of the deflection angle of the reflector 101 the digital-voltage signal to the correction-necessity determiner 36.

The correction-necessity determiner 36 determines whether a correction is necessary. The correction-necessity determiner 36 calculates a regression line 371 by linearly approximating the detection data of the period 370 in the received detection data of the deflection angle (see FIG. 22B). Then, when the difference between the regression line 371 and the detection data of the deflection angle for each time is the predetermined threshold or greater, the correction-necessity determiner 36 determines that the correction is "necessary" (Yes). When the difference is not the predetermined threshold or greater, the correction-necessity determiner 36 determines that the correction is "unnecessary" (No).

Thus, the correction-necessity determiner 36 outputs, to the waveform correction unit 37, a signal representing the determination result and the detection data of deflection angle of the reflector 101. The difference between the regression line 371 and the detection data of the deflection angle for each time refers to the above-described deflection-angle error, and is referred to as the deflection-angle error.

The waveform correction unit 37 includes a first determination unit 38. In response to receiving a signal representing the necessity of the correction output from the correction-necessity determiner 36, the waveform correction unit 37 corrects the waveform temporarily stored in the RAM 21 by the waveform acquisition unit 33.

The first determination unit 38 identifies the time 381 at which the deflection-angle error is the predetermined threshold or greater, and determine the times 360a and 360b that corresponds to the time 381 (see FIG. 22B).

Further, the first determination unit 38 determines the first slope that is the slope of the period 352a of the waveform 302a and also determines the third slope that is the slope of the period 352b of the waveform 302b, so as to cancel out the maximum deflection-angle error $\beta$ (see FIG. 22B).

Specifically, the first determination unit 38 calculates the voltage-change amount "a×$\beta$" of the minimum voltage value of the waveform 302a and the voltage-change amount "b×$\beta$" of the maximum voltage value of the waveform 302b, so as to cancel out the maximum deflection-angle error $\beta$. The maximum deflection-angle error $\beta$ and the voltage-change amounts "a×$\beta$" and "b×$\beta$" have a linear relation. For example, $\beta$ is represented by (a×$\beta$+b×$\beta$)×$\alpha$ ($\alpha$ is any desired constant) ($\beta$=(a×$\beta$+b×$\beta$)×$\alpha$). Thus, the voltage-change amounts "a×$\beta$" and "b×$\beta$" are obtained based on such a relation.

The first determination unit 38 determines the first slope by dividing the difference between "the voltage value at the time 360a" and "the minimum voltage value –$\beta$a" by the time length corresponding to the period 352a. Similarly, the third slope is determined by dividing the difference between "the voltage value at the time 360b" and "the maximum voltage value +$\beta$b" by the time length corresponding to the period 352b.

In such a manner, the waveform correction unit 37 corrects the waveform 301a and the waveform 301b using the first slope, the third slope, the time 360a, and the time 360b, so as to obtain the waveform 302a and the waveform 302b.

The drive-voltage waveform output unit 34 outputs the corrected waveform output from the waveform acquisition unit 33, to the piezoelectric-element drive unit 31b. Accordingly, the reflector 101 of the movable device 13a is movable while reducing the deflection-angle error.

In the embodiment, an equal drive voltage having the waveform 302a output from the drive-voltage waveform output unit 34 is applied to each of the second piezoelectric-drive circuits of the piezoelectric-drive-circuit group A. That is, the drive voltage having an identical waveform is applied to each of the second piezoelectric-drive circuits of the piezoelectric-drive-circuit group A. Similarly, a drive voltage having the waveform 302b output from the drive-voltage waveform output unit 34 is applied to each of the second piezoelectric-drive circuits of the piezoelectric-drive-circuit group B. That is, the drive voltage having an identical waveform is applied to each of the second piezoelectric-drive circuits of the piezoelectric-drive-circuit group B. However, this is only one example. A drive voltage having a different waveform may be applied to each of the second piezoelectric-drive circuits.

In this case, the factor a is equal to the factor b (a=b) in the above-described voltage-change amount "a×$\beta$" and "b×$\beta$". Alternatively, the contribution ratios of the waveforms 302a and 302b to the deflection angle of the reflector 101 may be adjusted by adjusting the factors a and b.

For example, if a is greater than b (a>b), the contribution of the waveform 302a to the deflection angle of the reflector 101 becomes relatively large, and if a is less than b (a<b), the contribution of the waveform 302b to the deflection angle of the reflector 101 become relatively large.

Alternatively, the whole voltage-change amount of the waveforms 302a and 302b may be adjusted with the constant α so as to adjust the reflection angle of the reflector 101.

In the embodiment, the cases in which the deflection-angle error occurs on the negative deflection-angle side are described. However, the above-described method of correcting the waveform of the drive voltage may be applied to the cases in which the deflection-angle error occurs on the positive deflection-angle side.

In the above description, the correction-necessity determiner 36 outputs, to the waveform correction unit 37, the signal indicating the determination result and the detection data of the deflection angle of the reflector 101. Alternatively, the correction-necessity determiner 36 may output, to the waveform correction unit 37, the signal indicating the determination result and the signal indicating the time 381. In this case, the processing for calculating the regression line of the detection data of the deflection angle in the waveform correction unit 37 can be omitted, so that the processing speed can be improved and the processing load can be reduced.

Figure 27:
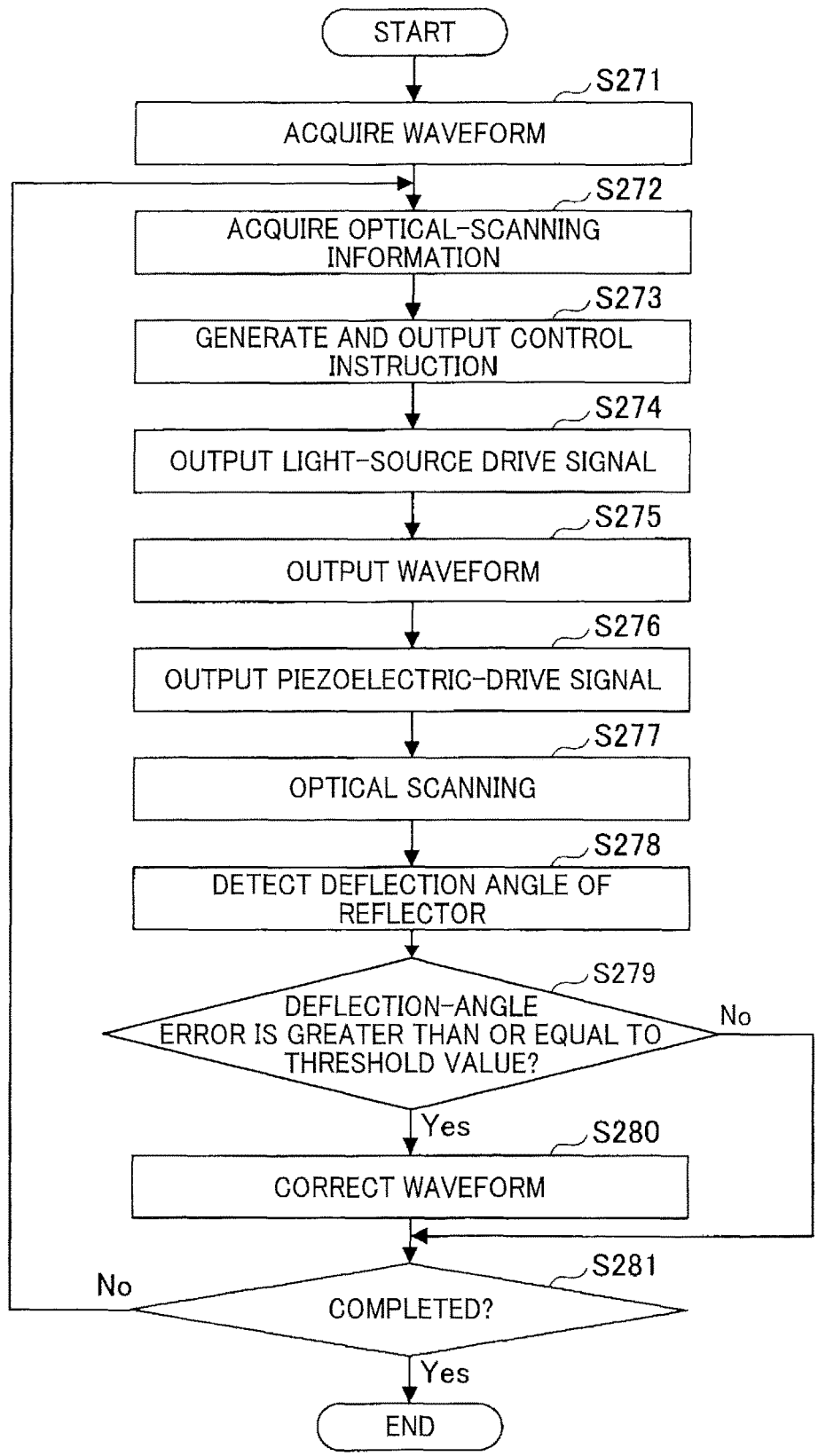
FIG. 27 is a flowchart of an example of the operation of the light deflection device according to the first embodiment.

Hereinafter, a description is given of an example operation of the light deflection device according to the present embodiment. FIG. 27 is a flowchart of an example operation of the light deflection device according to the present embodiment.

First, in step S271, the waveform acquisition unit 33 acquires waveforms, which are waveforms before a correction such as the waveforms 301a and 301b of drive voltages, referring to the waveform storage unit 32, and temporarily stores the waveforms in, for example, the RAM 21.

In step S272, the controller 30 acquires optical-scanning information from, for example, an external device.

Subsequently, the controller 30 generates a control signal from the acquired optical-scanning information, and outputs the control signal to the light-source drive unit 31a and the waveform acquisition unit 33.

In step S274, the light-source drive unit 31a outputs, to the light-source device 12, a drive signal based on the received control signal. The light-source device 12 emits light based on the received drive signal.

In step S275, the drive-voltage waveform output unit 34 receives a waveform from the waveform acquisition unit 33 and outputs the received waveform to the piezoelectric-element drive unit 31b.

In step S276, the piezoelectric-element drive unit 31b outputs a drive signal to the movable device 13a.

Subsequently, in step S277, the movable device 13a rotates (drives) the reflector 101 based on the received drive signal. The driving of the light-source device 12 and the reflector 101 of the movable device 13a causes light incident on the reflecting surface 14 of the reflector 101 to be deflected in any desired direction, and optical scanning (light deflection) is performed.

In step S278, the deflection-angle detection unit 35 converts the voltage generated in the piezoelectric portions 202 of the detection units 140a and 140b, into a digital-voltage signal, and outputs, to the correction-necessity determiner 36, the digital-voltage signal as the detection data of the deflection angle of the reflector 101.

In step S279, the correction-necessity determiner 36 calculates a regression line 371 by linearly approximating the detection data of the period 370 in the received detection data of the deflection angle, so as to determine whether the deflection-angle error is greater than or equal to the predetermined threshold value. Then, the correction-necessity determiner 36 outputs, to the waveform correction unit 37, a signal representing the determination result and the detection data of deflection angle of the reflector 101.

When the deflection-angle error is equal to or larger than the threshold (Yes in step S279), the waveform correction unit 37 converts the waveforms 301a and 301b temporarily stored in the RAM 21 or the like by the waveform acquisition unit 33 into the waveforms 302a and 302b in step S280. When the deflection-angle error is less than the threshold (No in step S279), the process proceeds to step S281.

In step S281, the controller 30 determines whether the optical scanning is completed based on the optical-scanning information. When the controller 30 determines that the optical scanning is completed (Yes in step S281), the light deflection device 10a ends the optical scanning. When the controller 30 determines that the optical scanning is not completed No in step S281), the process returns to step S272, and the processes after step S272 are continued.

The waveforms 302a and 302b obtained by correcting the waveforms 301a and 301b are used in the light deflection device 10a. Accordingly, the deflection-angle error can be reduced, and the reflector 101 of the movable device 13a can be rotated.

In the above-described embodiment, the drive-voltage waveform output unit 34 outputs at least one of the waveform 302a and the waveform 302b to the piezoelectric-element drive unit 31b. The waveform 302a has the period 351a of the positive slope within one cycle, and the period 351a includes the period 352a of the first slope and the period 353a of the second slope different from the first slope. The waveform 302b has the period 351b of the negative slope within one cycle, and the period 351b includes the period 351b of the third slope and the period 353b of the fourth slope different from the third slope.

With this configuration, the drive voltage having a waveform of the first slope whose absolute value is greater than the absolute value of the second slope is applied to the piezoelectric-drive-circuit groups A and B. The drive voltage having a waveform of the third slope whose absolute value is greater than the absolute value of the fourth slope is applied to the piezoelectric-drive-circuit groups A and B. Further, the decrease in the rotation speed of the reflector 101 at angles near the maximum deflection angle can be cancelled out, so that the deflection-angle error of the reflector 101 can be appropriately corrected.

In the present embodiment, the deflection angle error of the reflector 101 is corrected by canceling out the decrease in the reflector 101. However, this is only one example. For example, by using a waveform of a driving voltage in which the absolute value of the first slope is smaller than the absolute value of the second slope and the absolute value of the third slope is smaller than the absolute value of the fourth slope, the deflection-angle error due to the acceleration of the reflector 101 may be reduced.

Second Embodiment

The light deflecting device according to the second embodiment is described below. The description on components identical with those in the above-described embodiment may be omitted.

Figure 28:
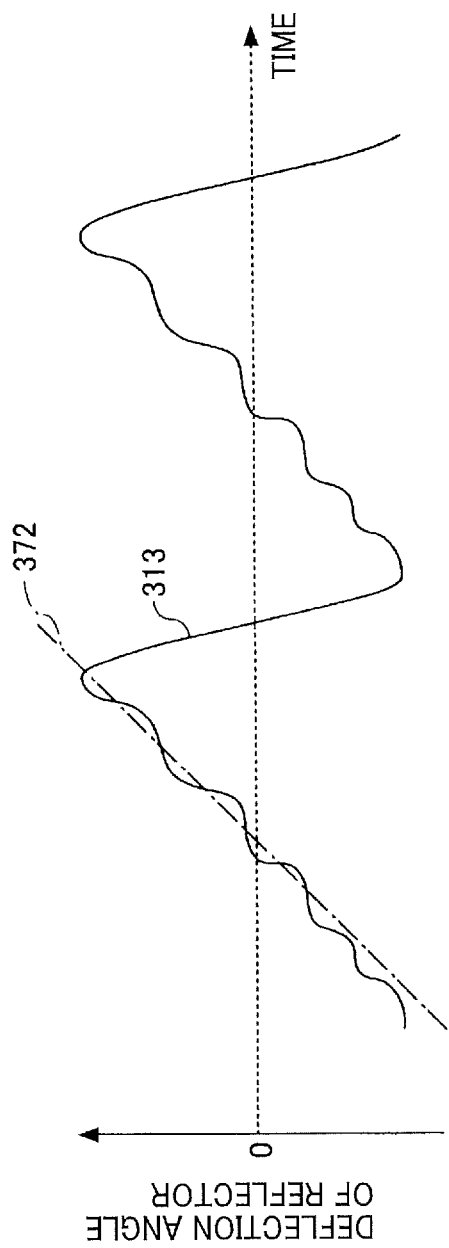
FIG. 28 is a graph for an example of the fluctuations in the deflection angle of the reflector.

There are cases in which the reflector rotates so that the deflection angle fluctuates with a change of rotation speed of the reflector, such as a change between a faster rotation speed and a slower rotation speed. FIG. 28 is a graph for an example of such fluctuations in the deflection angle of the reflector.

In the period of the positive slope of the deflection-angle changes 313 in FIG. 28, the deflection angle changes in a wavy manner with respect to a straight line 372 indicated by dot-and-dash line. This portion represents the fluctuation behavior. The behavior of the deflection angle is the fastest when passing through the center portion of the wavy line, and the behavior of the deflection angle becomes slower toward the upper and lower ends of the wavy line. In the wavy line, the acceleration portion and the deceleration portion are continuously generated.

Figure 29A:
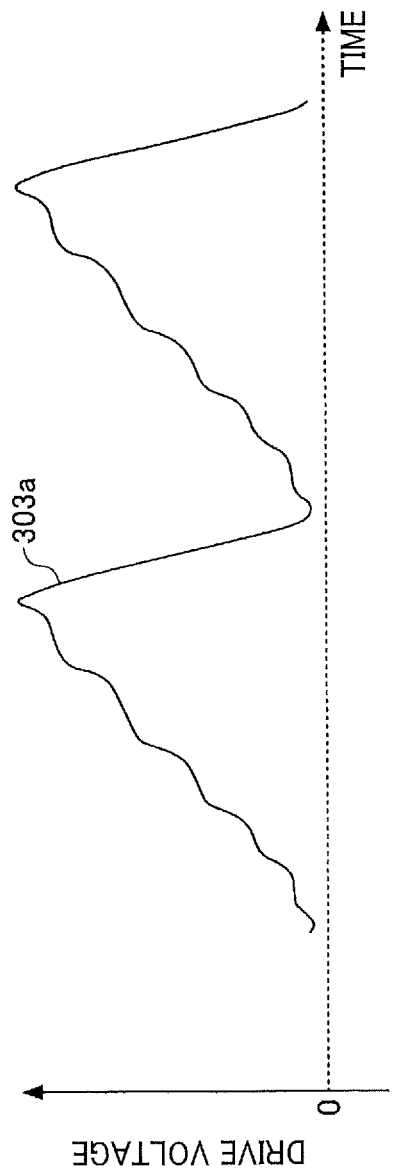
FIG. 29A is a graph for an example of a waveform of a drive voltage according to a comparative example.
Figure 29B:
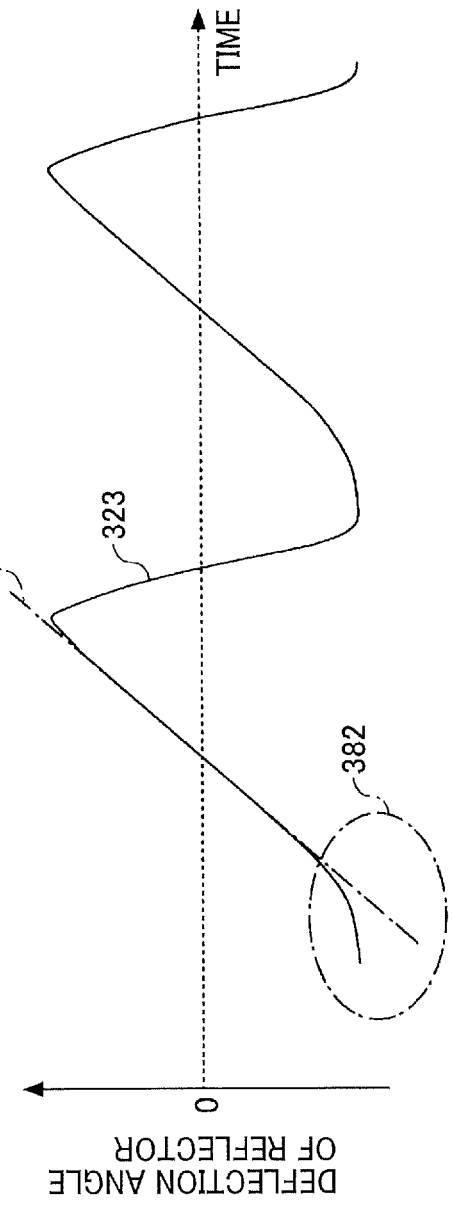
FIG. 29B is a graph for an example of the deflection angle of the reflector when the drive voltage of the waveform in FIG. 29A is applied.

FIG. 29A is a graph for an example of a waveform of a drive voltage according to a comparative example; FIG. 29B is a graph for an example of the deflection angle of the reflector when the drive voltage of the waveform in FIG. 29A is applied. In FIG. 29, only the waveform of the drive voltage A is illustrated, and the waveform of the drive voltage B is omitted.

As illustrated in FIG. 29A, the waveform 303a has fluctuations in which a voltage having a positive slope changes in a wavy manner. The phase of the voltage fluctuations is opposite to the phase of the fluctuations of the deflection angle in FIG. 28. That is, the phase of the voltage fluctuations is shifted by half a period from the phase of the fluctuations of the deflection angle.

By applying a drive voltage having a waveform that includes fluctuations with an opposite phase of the deflection-angle fluctuations, deflection angle fluctuations can be cancelled out as illustrated in FIG. 29B. In FIG. 29B, the fluctuations are cancelled out in the period of the positive slope, and the deflection-angle changes 323 along the straight line 372 is indicated.

However, as described in the first embodiment, the rotation speed of the reflector 101 decreases at angles near the maximum deflection angle, that is, angles at which the direction of deflection is reversed. Accordingly, the deflection-angle error occurs such that the deflection-angle changes deviate from the linear as illustrated in the time period surrounded by the circle 382 of a two-dot chain line. Such a deflection-angle error cannot be cancelled out by the drive voltage having a waveform including the fluctuations with the opposite phase of the deflection-angle fluctuations. As a result, image failures such as image distortion may occur in the image projected by the image projection apparatus using the light deflection device.

In the light deflection device 10b according to the present embodiment, the reflector is rotated by using the waveform in which the waveform with fluctuations having the phase opposite to the phase of the deflection-angle fluctuations is superimposed on the waveform after correction described in the first embodiment.

FIGS. 30A and 30B are illustrations for describing a waveform of a drive voltage and its effects in the second embodiment, FIG. 30A illustrating an example of the waveform of the drive voltage and FIG. 30B illustrating the deflection angle of the reflector when the drive voltage with the waveform in FIG. 30A is applied. In FIGS. 30A and 30B, only the waveform of the drive voltage A is illustrated, and the waveform of the drive voltage B is omitted.

In the waveform 304a, a period 354a corresponds to one cycle of the waveform 304a. Further, a period 355a is a period of a positive slope within one cycle of the waveform 304a. The period 356a is a period of a waveform in which a waveform with fluctuations having a phase opposite to the phase of the waveform of the deflection angle fluctuations is superimposed on the waveform having the first slope. The period 357a is a period of a waveform in which a waveform with fluctuations having a phase opposite to the phase of the waveform of the deflection angle fluctuations is superimposed on the waveform having the second slope.

A time 361a indicates a time at which the slope changes from the first slope to the second slope. The time 361b is represented by, for example, a time it takes from a starting time of the waveform 302a, and corresponds to the period 356a. As illustrated in FIGS. 30A and 30B, the waveform 304b of the drive voltage B may be a waveform in which the waveform with fluctuations having a phase opposite to the phase of the waveform of the deflection-angle fluctuations is superimposed on the waveform having the third slope. Note that the waveform 304a for one cycle is an example of a first drive-voltage waveform obtained by superimposing a waveform of the drive-voltage changes having an opposite phase of the phase of the waveform of the detected deflection-angle changes with time, on the corrected waveform. Further, the waveform 304b for one cycle is an example of a second drive-voltage waveform obtained by superimposing a waveform of the drive-voltage changes having an opposite phase of the phase of the waveform of the detected deflection-angle changes with time, on the corrected waveform.

The waveform having the opposite phase of the phase of the waveform of the detected deflection-angle can be generated using known methods.

By using the waveform illustrated in FIG. 30A, the deflection-angle fluctuations can be cancelled out by the voltage fluctuations with the opposite phase. Further, the decrease in the rotation speed of the reflector 101 at the angles near the maximum deflection angle can be cancelled out by using the waveform having the first slope or the third slope. As a result, as illustrated in FIG. 30B, the deflection-angle changes 324 along the straight line 372 can be obtained.

The other effects are the same as those described in the first embodiments.

Third Embodiment

The light deflecting device according to the third embodiment is described below.

The description on components identical with those in the above-described embodiment may be omitted.

The light deflection device according to the present embodiment includes a control device 11b, a light-source device 12, and a movable device 13 (see FIG. 15).

Figure 31:
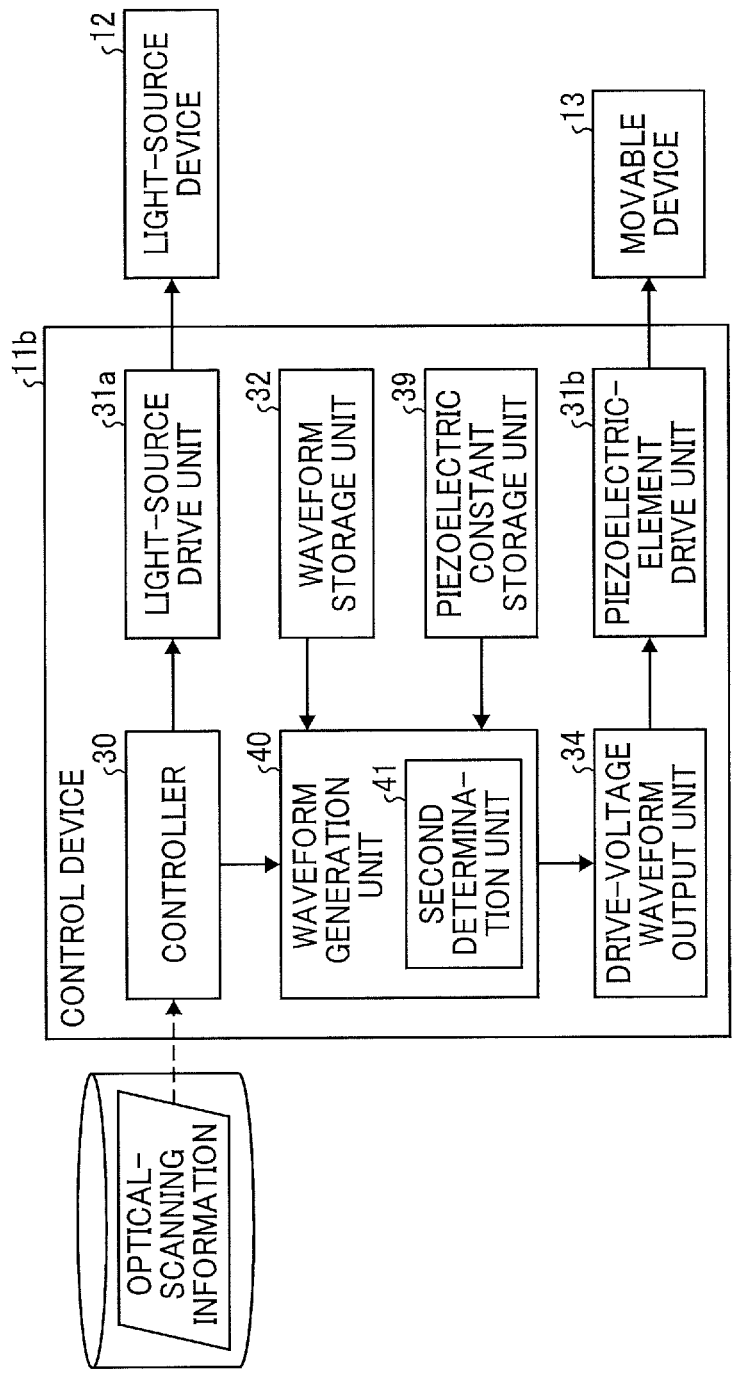
FIG. 31 is a functional block diagram of an example of a control device according to the third embodiment.

FIG. 31 is a functional block diagram of an example of a control device according to the third embodiment. The control device 11b includes a piezoelectric constant storage unit 39 and a waveform generation unit 40.

The piezoelectric constant storage unit 39 is implemented by, for example, the ROM 22. The piezoelectric constant storage unit 39 stores a piezoelectric constant of the piezoelectric portions 202 provided in the piezoelectric-drive-circuit groups A and B. Note that the piezoelectric constant is a constant specific to the piezoelectric element indicating the displacement (the degree of deformability) of the piezoelectric portion when a voltage is applied.

The waveform generation unit 40 acquires a waveform referring to the waveform storage unit 32, and acquires a piezoelectric constant referring to the piezoelectric constant storage unit 39. Moreover, the waveform generation unit 40 includes a second determination unit 41, and generates the waveforms 302a and 302b after correction described in the first embodiment, using the acquired waveform and piezoelectric constant.

The second determination unit 41 determines the first slope, the third slope of the waveform, the time 360a, and the time 360b based on the acquired piezoelectric constant. Specifically, the second determination unit 41 includes a look-up table (LUT) indicating the relation between the piezoelectric constant, and the first slope and the third slope, and also includes a LUT indicating the relation between the piezoelectric constant, and the times 360a and 360b. The second determination unit 41 determines data regarding the first slope, the third slope, the time 360a, and the time 360b based on the acquired piezoelectric constant, referring to the LUT. The above-described LUT may be stored in, for example, the waveform storage unit 32, and the second determination unit 41 may acquire the LUT by referring to the waveform storage unit 32.

The waveform generation unit 40 corrects the waveform acquired from the waveform storage unit 32, using the first slope, the third slope, the time 360a, and the time 360b determined by the second determination unit 41, and generates the corrected waveforms 302a and 302b.

The waveform generation unit 40 outputs to the drive-voltage waveform output unit 34 the corrected waveform s302a and 302b generated, so as to rotate the reflector 101 of the movable device 13.

Figure 32:
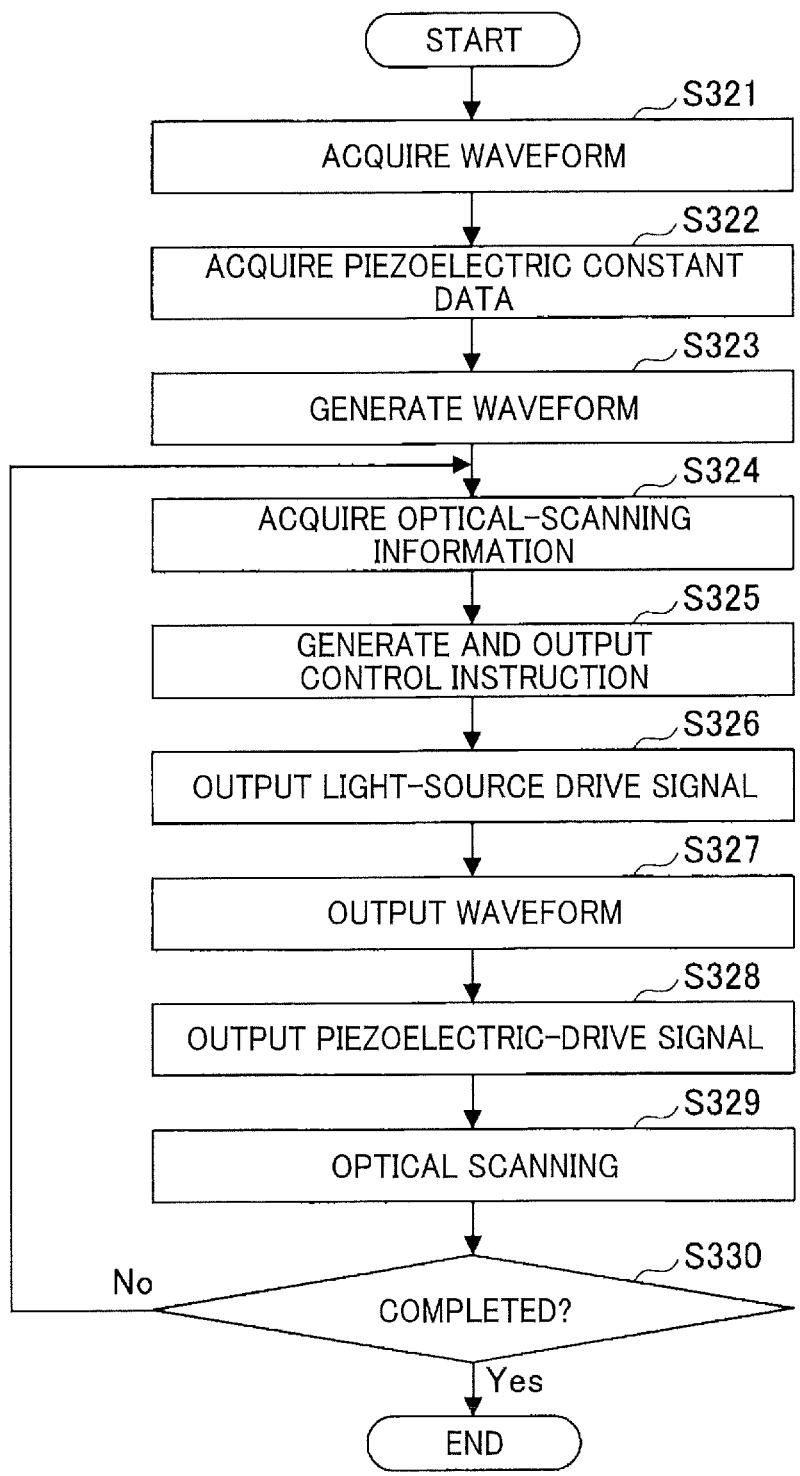
FIG. 32 is a flowchart of an example of the operation of the light deflection device according to the third embodiment.

FIG. 32 is a flowchart of an example of the operation of the light deflection device according to the third embodiment.

First, in step S321, the waveform generation unit 40 acquires the waveforms 301a and 301b, which are waveforms before correction, referring to the waveform storage unit 32.

In step S322, the waveform generation unit 40 acquires a piezoelectric constant of the piezoelectric portions 202 of the piezoelectric-drive-circuit groups A and B, referring to the piezoelectric constant storage unit 39.

Subsequently, in step S323, the second determination unit 41 determines the first slope, the third slope, the time 360a, and the time 360b based on the acquired piezoelectric constant, referring to the LUT. The waveform generation unit 40 corrects the waveform acquired from the waveform storage unit 32, using the first slope, the third slope, the time 360a, and the time 360b determined by the second determination unit 41, and generates the corrected waveforms 302a and 302b.

In step S324, the controller 30 acquires optical-scanning information from, for example, an external device.

Subsequently, in step S325, the controller 30 generates a control signal from the acquired optical-scanning information, and outputs the control signal to the light-source drive unit 31a and the waveform generation unit 40.

In step S326, the light-source drive unit 31a outputs to the light-source device 12 a drive signal based on the received control signal. The light-source device 12 emits light based on the received drive signal.

In step S327, the waveform generation unit 40 outputs the generated waveforms 302a and 302b to the drive-voltage waveform output unit 34, and outputs the received waveform 302a and 302b to the piezoelectric-element drive unit 31b.

In step S328 the piezoelectric-element drive unit 31b outputs a piezoelectric-drive signal to the movable device 13.

Subsequently, in step S329, the movable device 13 rotates (drives) the reflector 101 based on the received piezoelectric drive signal. The driving of the light-source device 12 and the reflector 101 of the movable device 13 causes light incident on the reflecting surface 14 of the reflector 101 to be deflected in any desired direction, and optical scanning is performed.

In step S330, the controller 30 determines whether the optical scanning is completed based on the optical-scanning information. When the controller 30 determines that the optical scanning is completed (Yes in step S330), the light deflection device 10b ends the optical scanning. When the controller 30 determines that the optical scanning is not completed No in step S330), the process returns to step S324, and the processes after step S324 are continued.

The waveforms 302a and 302b generated by the waveform generation unit 40 are used by the light deflection device 10c. Accordingly, the deflection-angle error can be reduced, and the reflector 101 of the movable device 13 can be rotated.

As described above, the light deflection device 10c according to the present embodiment includes the piezoelectric constant storage unit 39 for storing the piezoelectric constant, and the waveform generation unit 40 for generating the waveforms 302a and 302b. The waveform generation unit 40 includes a second determination unit that determines the first slope, the third slope, the time 360a, and the time 360b based on the piezoelectric constant acquired from the piezoelectric constant storage unit.

By using the generated waveforms 302a and 302b, the drive voltage having a waveform of the first slope whose absolute value is greater than the absolute value of the second slope is applied to the piezoelectric-drive-circuit groups A and B. The drive voltage having a waveform of the third slope whose absolute value is greater than the absolute value of the fourth slope is applied to the piezoelectric-drive-circuit groups A and B. Accordingly, the decrease in the rotation speed of the reflector 101 at angles near the maximum deflection angle can be cancelled out, so that the deflection-angle error of the reflector 101 can be appropriately corrected.

Advantageous effects other than those described above are similar to those described in the above-described embodiments.

Although the embodiments of the present disclosure have been described above, the present disclosure is not limited to such specific embodiments, and various other embodiments may be used without departing from the spirit and scope of the present disclosure as set forth in the appended claims.

In the above-described embodiments, the movement operation of the deflection angle of the reflecting surface of the lower part is nonuniform. In the upper part of the reflector as well, if there is a shifted position where the difference from an ideal movement operation is greater than or equal to a certain value, a time for changing the slope may be provided for the upper part as well so that the time a' is set for the drive A and the time b' is set for the drive B. Accordingly, the uniformity of the movement operation of the deflection angle of the reflecting surface of the upper part may be improved.

Figure 33A:
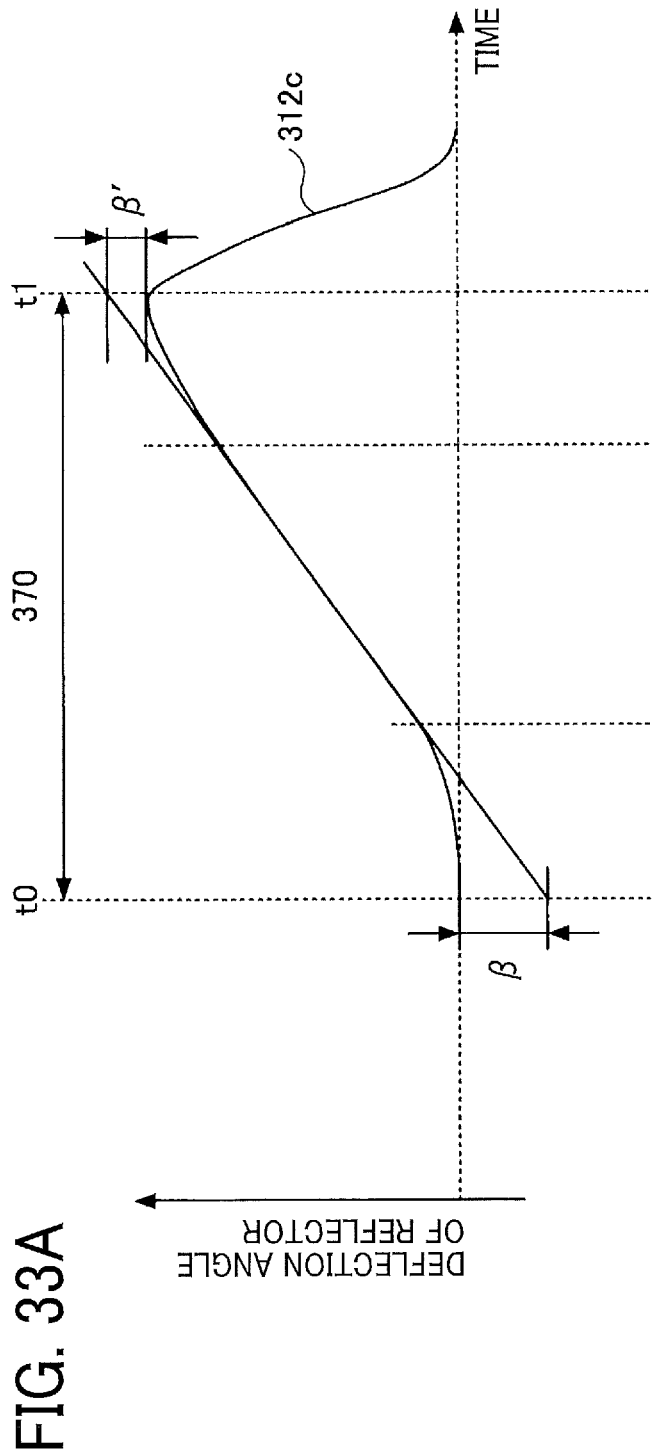
FIGS. 33A and 33B are graphs for describing the case in which the movement operation of the deflection angle of the reflecting surface is nonuniform between the upper part and the lower part, FIG. 33A illustrating an example of the deflection angle of the reflector when the drive voltage of the waveform before a correction is applied, and FIG. 33B illustrating an example of the corrected waveform of the drive voltage.
Figure 33B:
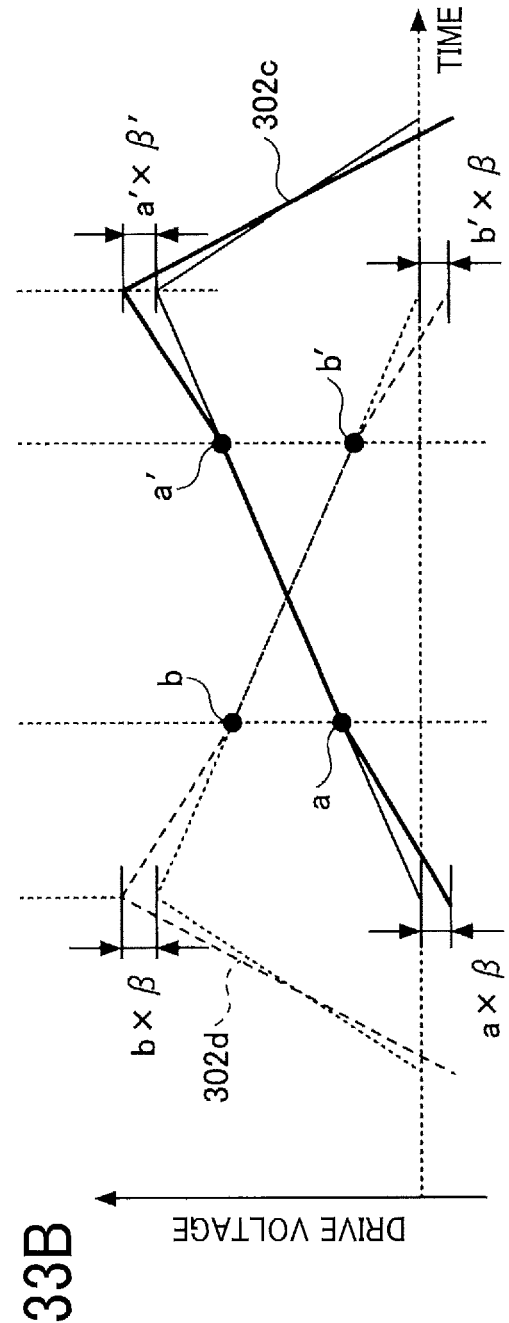

FIGS. 33A and 33B are graphs for describing the case in which the movement operation of the deflection angle of the reflecting surface is nonuniform between the upper part and the lower part. FIG. 33A is a graph for describing an example of the deflection angle of the reflector when the drive voltage of the waveform before a correction is applied.

FIG. 33B is a graph for describing an example of the corrected waveform of the drive voltage.

FIG. 33A is a graph for changes 312c in the deflection angle of the reflector 101 when a drive voltage with the waveforms 301a and 301b before correction (those waveforms have not been corrected) is applied. In FIG. 33A, the deflection-angle changes for one cycle are indicated with respect to the drive voltage. As illustrated in FIG. 33A, a deflection-angle error, that is, a maximum deflection-angle error β occurs at the lower portion of the deflection-angle changes 312c. Further, another deflection-angle error, that is, a maximum deflection-angle error β' occurs at the upper portion of the deflection-angle changes 312c In FIG. 33B, the waveform 302c indicates a waveform obtained by correcting the waveform 301a in FIG. 20A. The slope of the drive voltage over the time period from the time t0 to the time a is corrected based on the detected deflection angle of the lower part of the reflector 101. In FIG. 33B, "a×β" denotes the amount of change in the voltage of the waveform 302c to cancel out the maximum deflection-angle error β. The slope of the drive voltage over the time period from the time a' to the time t1 is corrected based on the detected deflection angle of the upper part of the reflector 101. In FIG. 33B, "a'×β'" denotes the amount of change in the voltage of the waveform 302c to cancel out the maximum deflection-angle error β'.

The waveform 302d in FIG. 33B is a waveform obtained by correcting the waveform 301b in FIG. 20A. The slope of the drive voltage over the time period from the time t0 to the time b is corrected based on the detected deflection angle of the lower part of the reflector 101. In FIG. 33B, "b×β" denotes the amount of change in the voltage of the waveform 302d to cancel out the maximum deflection-angle error β. The slope of the drive voltage over the time period from the time b' to the time t1 is corrected based on the detected deflection angle of the upper part of the reflector 101. In FIG. 33B, "b'×β'" denotes the amount of change in the voltage of the waveform 302d to cancel out the maximum deflection-angle error β'.

By using such waveforms 302c and 302d, the decrease in the rotation speed of the reflector 101 at angles near the maximum deflection angle, that is, the direction of deflection is reversed in the upper and lower parts of the reflector can be cancelled out, so that the deflection-angle error of the reflector 101 can be appropriately corrected.

Note that, same as the optical scanning system 10, the above-described light deflection devices 10a, 10b, and 10c are applicable in the HUD, the optical writing device, the LiDAR device, the laser head lump, and the HMD as described in FIGS. 5 to 13.

The present invention can be implemented in any convenient form, for example using dedicated hardware, or a mixture of dedicated hardware and software. The present invention may be implemented as computer software implemented by one or more networked processing apparatuses. The processing apparatuses can include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can include a transient carrier medium such as an electrical, optical, microwave, acoustic or radio frequency signal carrying the computer code. An example of such a transient medium is a TCP/IP signal carrying computer code over an IP network, such as the Internet. The carrier medium can also include a storage medium for storing processor readable code such as a floppy disk, hard disk, CD ROM, magnetic tape device or solid state memory device.

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A light deflection device comprising:
   a reflector;
   a drive beam supporting the reflector such that the reflector is movable;
   a supporting section supporting the drive beam;
   a piezoelectric drive circuit disposed on the drive beam, the piezoelectric drive circuit including a piezoelectric element that is deformable according to a waveform of a drive voltage, the piezoelectric element configured to drive the reflector by deforming of the piezoelectric element; and
   circuitry configured to output a first drive-voltage waveform and a second drive-voltage waveform to the piezoelectric drive circuit,
   the first drive-voltage waveform having a period of a positive slope within one cycle, the period of the positive, slope including at least a period of a first slope and a period of a second slope different from the first slope,
   the second drive-voltage waveform having a period of a negative slope within one cycle, the period of the negative slope including at least a period of a third slope and a period of a fourth slope different, from the third slope, and
   the period of the second slope and the period of the fourth slope being set according to a change in a piezoelectric constant of the piezoelectric element.

2. The light deflecting device according to claim 1,
   wherein a tilt angle of the second slope is greater than a tilt angle of the first slope, and
   a tilt angle of the fourth slope is geater than a tilt angle of the third slope.

3. The light deflecting device according to claim 1,
   wherein the circuitry is further configured to:
   detect a deflection angle of the reflector driven by the piezoelectric drive circuit; and
   determine, based on the detected deflection angle, the first slope, the third slope, a time for a change from the first slope to the second slope, and another time for a change from the third slope to the fourth slope, to correct the waveform of the drive voltage.

4. The light deflecting device according to claim 3,
   wherein the circuitry is configured to correct the waveform of the drive voltage
   when a difference between the detected deflection angle and a preset value is greater than or equal to a threshold value.

5. The light deflecting device according to claim 1,
   wherein the circuitry is further configured to:
   store the piezoelectric constant of the piezoelectric element of the piezoelectric drive circuit;

generate the first drive-voltage waveform and the second drive-voltage waveform; and determine the first slope, the third slope, a time for a change from the first slope to the second slope, and a time for a change from the third slope to the fourth slope based on the stored piezoelectric constant.

6. The light deflection device according to claim 1, wherein the circuitry is further configured to output at, least one of the first drive-voltage waveform and the second drive-voltage waveform in each of which a waveform of changes in the drive voltage having a phase opposite to a phase of a waveform of changes in the detected deflection angle is superimposed on a corrected waveform.

7. The light deflection device according to claim 1, wherein the drive beam includes a plurality of drive beams and each of the drive beams includes a serpentine beam including a plurality of beams joined to turn, the piezoelectric drive circuit is disposed on each of the plurality of beams, and the circuitry outputs a same waveform of a drive voltage to each piezoelectric drive circuit.

8. An image projector comprising the light deflection device according to claim 1.

9. The image projector according to claim 8, wherein the light deflection device scans a surface of a light transmissive member with light emitted from a light source.

10. A laser head lump comprising the light deflection device according to claim 1.

11. A mobile object comprising:
the light deflection device according to claim 1;
an image projector including the light deflection device; and
a laser head lamp including the light deflection device.

\* \* \* \* \*